United States Patent [19]
Saito et al.

[11] Patent Number: 5,954,650
[45] Date of Patent: Sep. 21, 1999

[54] MEDICAL IMAGE PROCESSING APPARATUS

[75] Inventors: Kazuyo Saito; Yuko Tanaka, both of Tochigi, Japan

[73] Assignee: Kabushiki Kaisha Toshiba, Kawasaki, Japan

[21] Appl. No.: 08/968,453

[22] Filed: Nov. 12, 1997

[30] Foreign Application Priority Data

Nov. 13, 1996 [JP] Japan .................................. 8-302050

[51] Int. Cl.⁶ ............................................. A61B 5/00
[52] U.S. Cl. ............................................ 600/425; 382/128
[58] Field of Search .................................. 600/407, 410, 600/425, 426, 427; 128/920, 922; 382/128

[56] References Cited

U.S. PATENT DOCUMENTS

| | | | |
|---|---|---|---|
| 4,651,744 | 3/1987 | Bristow et al. | 128/660 |
| 4,977,505 | 12/1990 | Pelizzari et al. | 364/413.19 |
| 5,003,979 | 4/1991 | Merickel et al. | 128/653 A |
| 5,099,846 | 3/1992 | Hardy | 128/653.1 |
| 5,348,020 | 9/1994 | Hutson | 128/696 |
| 5,398,684 | 3/1995 | Hardy | 128/653.1 |
| 5,479,927 | 1/1996 | Shmulewitz | 128/660.09 |
| 5,531,227 | 7/1996 | Schneider | 128/653.1 |
| 5,568,384 | 10/1996 | Robb et al. | 364/419.13 |
| 5,590,215 | 12/1996 | Allen | 382/128 |
| 5,640,496 | 6/1997 | Hardy et al. | 395/121 |
| 5,662,109 | 9/1997 | Hutson | 128/653.1 |
| 5,662,111 | 9/1997 | Cosman | 128/653.1 |
| 5,729,620 | 3/1998 | Wang | 382/128 |
| 5,740,802 | 4/1998 | Nafis et al. | 128/653.1 |
| 5,752,916 | 5/1998 | Guerard et al. | 600/407 |
| 5,769,789 | 6/1998 | Wang et al. | 600/414 |

*Primary Examiner*—Marvin M. Lateef
*Assistant Examiner*—Eleni Mantis Mercader
*Attorney, Agent, or Firm*—Oblon, Spivak, McClelland, Maier & Neustadt, P.C.

[57] ABSTRACT

A display screen of an image display section is divided into an image display area for displaying an image and an operation panel display area, an image (base image) imaged by an X-ray CT apparatus, for example, is displayed on the upper part (base area) of the image display area, an image (match image) imaged by a MRI apparatus is displayed in the middle part (match area), and an operation panel, which is composed of an operation panel display area 2 of the image display section and respective operation keys for aligning the images, is displayed thereon. When the operation panel is operated and fit points are provided to the images or a region of interest (ROI) is set on the base image, a CPU aligns and composes the respective images based on the fit points or ROI, and displays the fusion image on the lower part (fusion area) of the image display area. As a result, both the images can be compared with each other visually.

12 Claims, 19 Drawing Sheets

DRAGGING SPECIFYING REGION

CORNAL  SAGITAL  AXIAL

ACTUAL SHIFTING BETWEEN DATA

MEDICAL IMAGE PROCESSING APPARATUS

BACKGROUND OF THE INVENTION

1. Field of the Invention

The present invention relates to a medical image processing apparatus in which accuracy of diagnosis, facilitation of a medical treatment plan, etc. are improved by displaying images which have been obtained by medical image diagnostic apparatuses using different image pickup methods such as an X-ray CT apparatus, MRI apparatus (magnetic resonance imaging apparatus), nuclear medicine diagnostic apparatus, ultrasonic image diagnostic apparatus and X-ray diagnostic apparatus.

2. Prior Art

Conventionally, images obtained by medical image diagnostic apparatuses (modality) such as an X-ray CT apparatus and MRI apparatus are two-dimensionally coaxial tomograms, so it is difficult to obtain and diagnose a three-dimensionally inside structure of a human body from one coaxial tomogram. Therefore, only one coaxial tomogram is imaged infrequently, and in general, a plurality coaxial tomograms including an internal organs of interest (internal organs to be diagnosed) are imaged.

According to the improvement in the image pick-up technique in recent years, a plurality of coaxial tomograms can be picked up at high speed in the X-ray CT apparatus and MRI apparatus employing a helical scanning method or SPECT apparatus (Single Photon Emission CT: nuclear medicine image CT apparatus), etc., and in a clinical examination, a diagnosis is made and medical treatment is planned based on a plurality of the coaxial tomograms imaged by these modalities.

In the field of the clinical examinations, a diagnosis is made and medical treatment is planned mostly by comparing different tomograms which were imaged in different times, but even in the case of the same patient, it is difficult to image each coaxial tomogram in the same pose unless a special locking instrument is attached to the patient. Moreover, it is also difficult to adjust each imaging conditions such as a slice thickness, slice pitch and image size per modality and then to image each coaxial tomogram.

For this reason, in the case where coaxial tomograms imaged by modalities using different imaging methods are compared with each other, a doctor has superimposed the coaxial tomograms on each other imaginarily based on his experiences and knowledge, and has made a diagnosis and planned medical treatment according to the invisible and imaginary fusion coaxial tomogram.

Then, because of such inconvenience, a medical image processing apparatus, in which coaxial tomograms imaged by modalities using different imaging methods such as a coaxial tomogram imaged by the X-ray CT apparatus and a coaxial tomogram imaged by the MRI apparatus can be compared with each other realistically and visually, is strongly desired to be developed.

SUMMARY OF THE INVENTION

The present invention is invented in view of the circumstances, and it is an object of the present invention to provide a strongly desired medical image processing apparatus where images of the same position with the same size, which have been imaged by modalities using different imaging methods, are superimposed on and composed with each other and are displayed so as to be able to be compared with each other realistically and visually.

In order to achieve the above object, there is provided a medical image processing apparatus comprising image capturing means for capturing a plurality of medical images obtained by imaging an object to be examined, aligning means for aligning the medical images captured by the image capturing means, fusion image forming means for forming fusion image by superimposing the medical images aligned by the aligning means on each other, display means for displaying the medical images thereon, display control means for controlling the display of the fusion image of the respective medical image formed by the fusion image forming means on the display means.

Examples of medical images to be composed and displayed are two (or more) medical images imaged by an imaging apparatus using the same imaging methods, and medical images imaged by imaging apparatuses using different imaging methods such as an X-ray CT apparatus and MRI apparatus.

When such medical images are captured, the aligning means aligns each medical image, and the fusion image forming means superimposes the aligned medical images on each other so as to form a fusion image. The display control means controls the display of the fusion image of the medical images formed by the fusion image forming means on the display means.

As a result, an operator can compare the images with each other realistically and visually based on the fusion image displayed on the display means, and can make a diagnosis and plan medical treatment easily in the clinical examination.

In the preferable embodiment of the present invention, the display control means controls the display of the medical images captured by the image capturing means as well as the fusion image on the display means.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The following describes preferable embodiments of the medical image processing apparatus of the present invention in detail on reference to the drawings.

Figure 1:
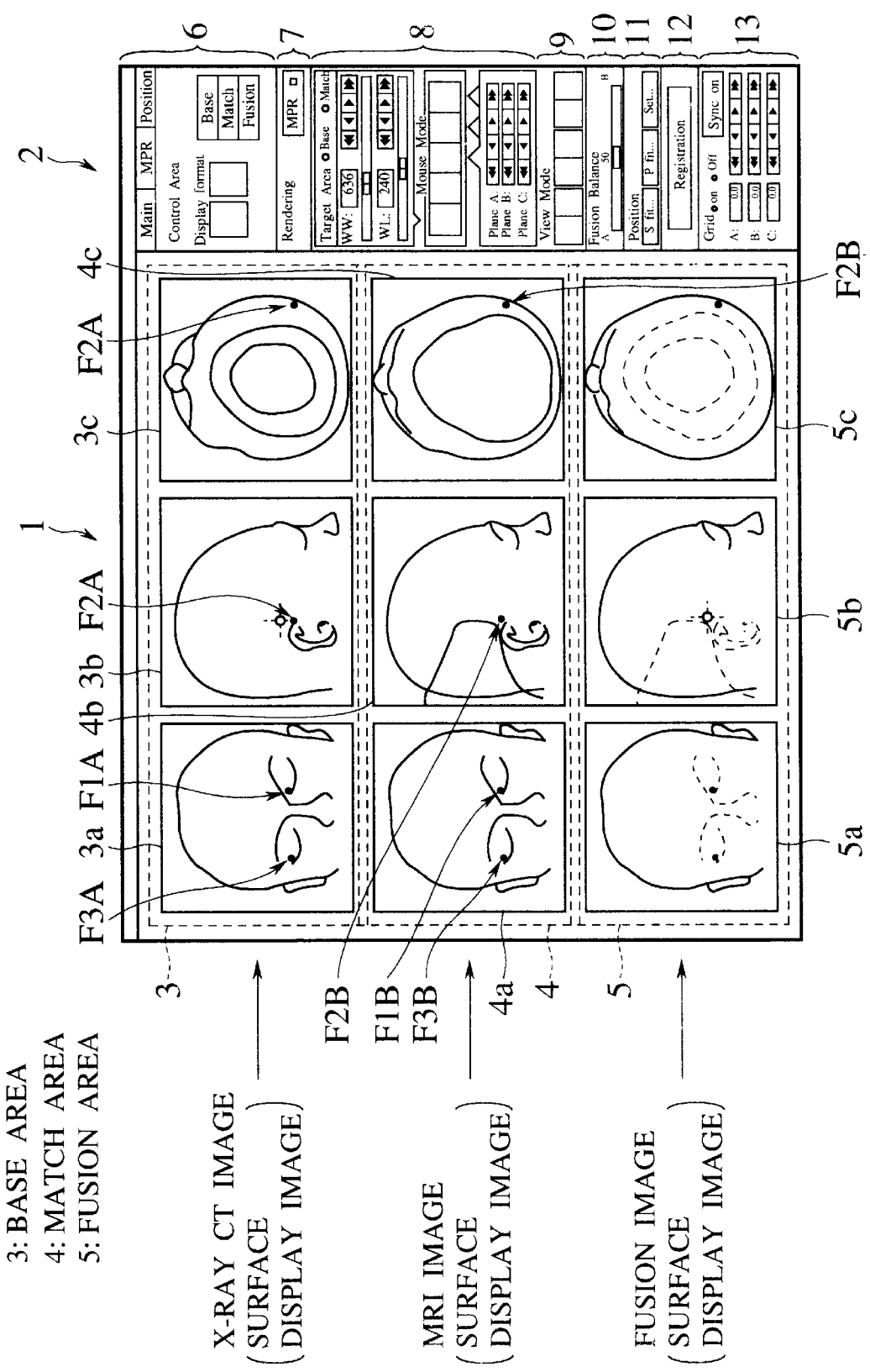
FIG. 1 is a schematic drawing showing a result of composing three-dimensionally surface images obtained by different modalities with each other and displaying fusion images on an image display section provided to a medical image processing apparatus according to embodiment of the present invention.

First, in the medical image processing apparatus according to embodiment of the present invention, as shown in FIG. 1, a display screen of an image display section is divided into an image display area 1 and an operation panel display area 2, the image display area 1 is divided into three sections, namely, an upper part, a middle part and a lower part. An image imaged by an X-ray CT apparatus, for example, is displayed on the upper part as a base area 3, an image imaged by an MRI apparatus, for example, is displayed on the middle part as a match area 4, and a fusion image obtained by composing the images is displayed on the lower part as a fusion area 5.

A plurality of operation keys relating to display of such a fusion image are displayed on the operation panel display area 2.

Figure 2:
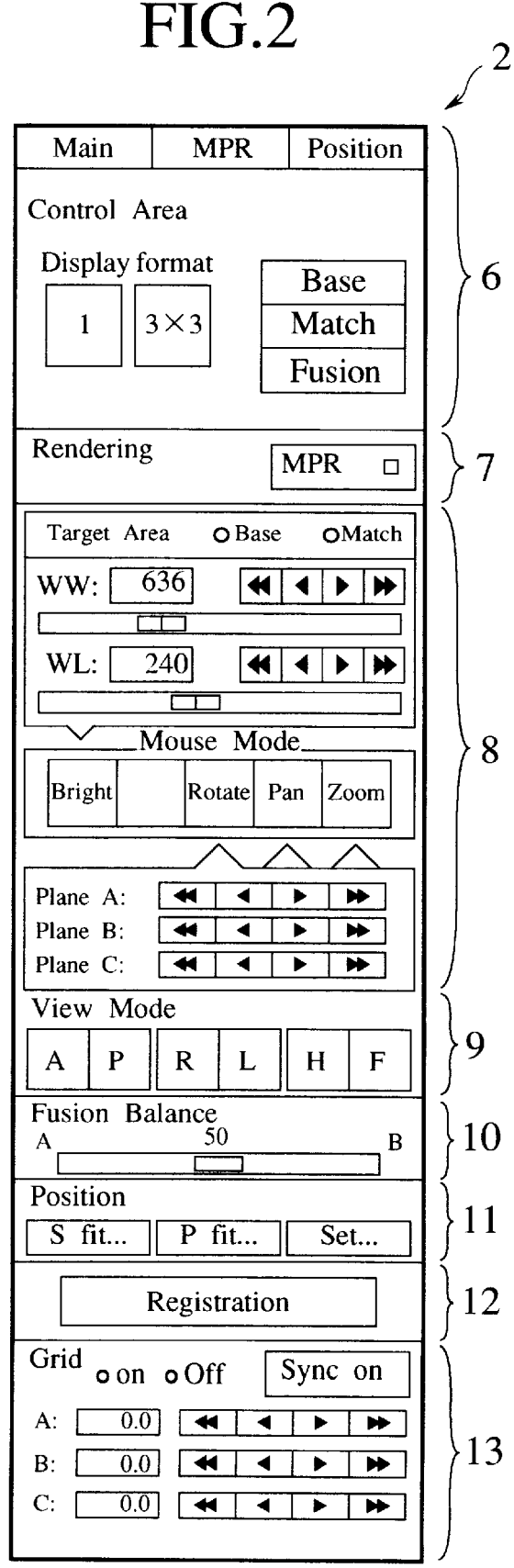
FIG. 2 is a drawing showing an operation panel as well as the fusion images displayed on the image display section.

More specifically, as shown in FIG. 2, the operation panel display area 2 is composed of a control area 6, a rendering area 7, a mouse mode area 8, a view mode area 9, a fusion balance area 10, a position area 11, a save area 12 and a grid area 13.

Figure 4:
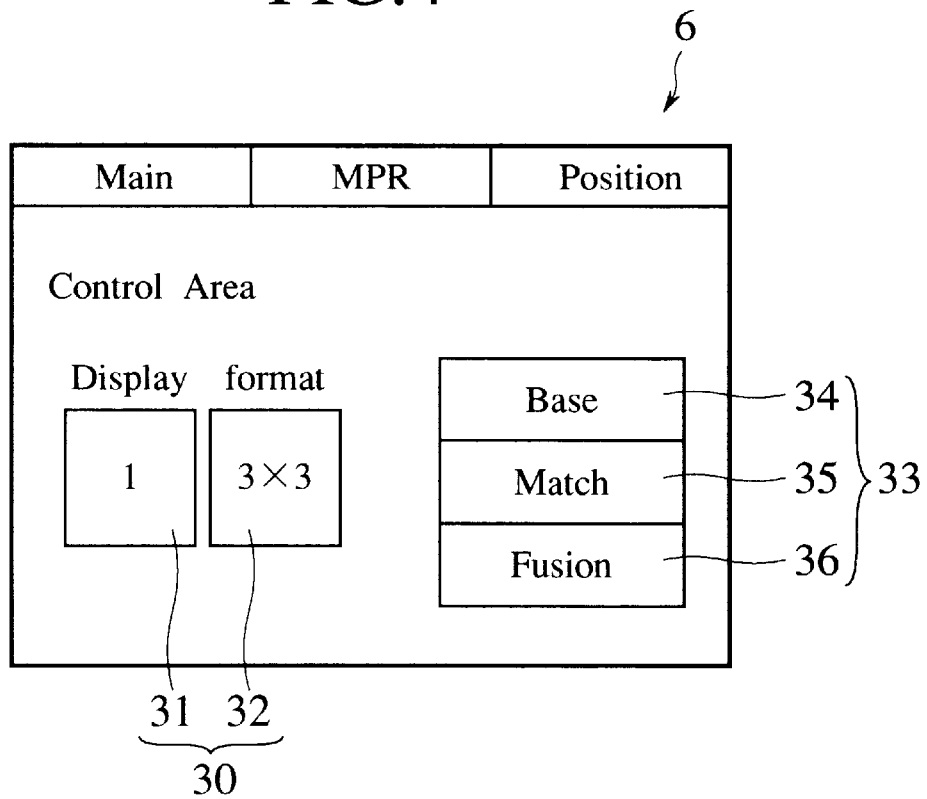
FIG. 4 is a drawing showing a control area of the operation panel.

As shown in FIG. 4, the control area 6 is provided with a display specifying key 30 for selecting a display format (one-section display/9-section display) of an image displayed in the image display area, a study selecting key 33, etc. for selecting an image (study) to be displayed in the image display area.

Figure 7A:
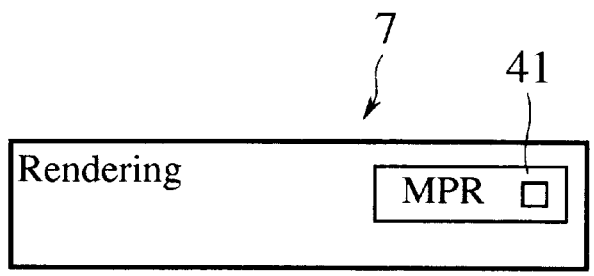
FIGS. 7A and 7B are drawings showing a rendering area of the operation panel.
Figure 7B:
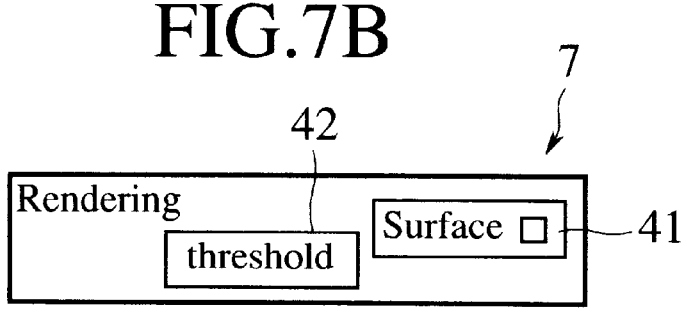

As shown in FIGS. 7A and 7B, the rendering area 7 is provided with a display mode switching key 41, etc. for switching an image to be displayed in the image display area 1 between a coaxial tomogram (MPR) and a surface image.

Figure 10:
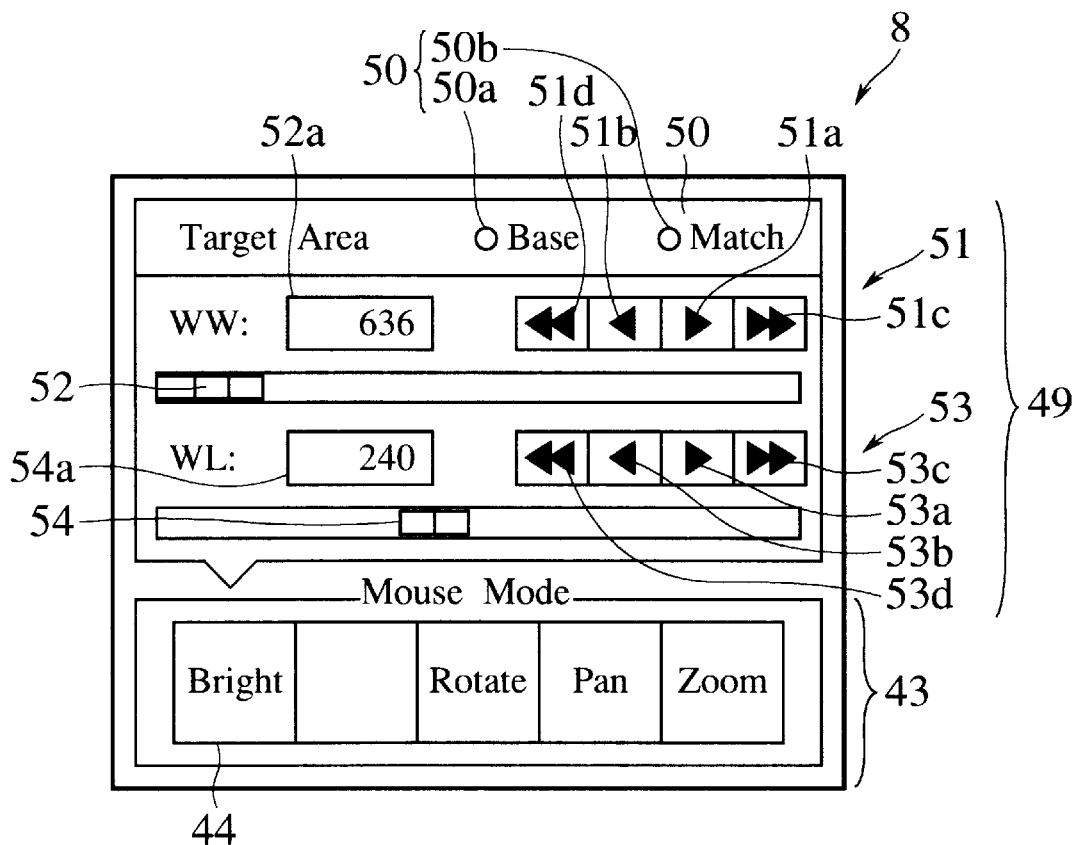
FIG. 10 is a drawing explaining setting of a window width and a window level of the display screen in the mouse mode area.

As shown in FIG. 10, the mouse mode area 8 is provided with mouse mode selecting keys 43 for selecting respective modes, mentioned later, and a display panel 49 to be displayed according to a mode selected by the mouse mode selecting keys 43.

Figure 11:
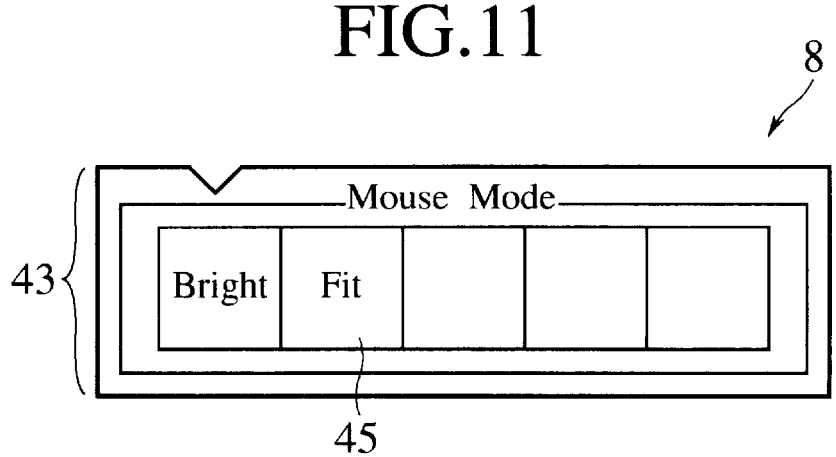
FIG. 11 is a drawing explaining fit mode specifying keys displayed on the mouse mode area when fit points for aligning images of different modalities are specified.
Figure 12:
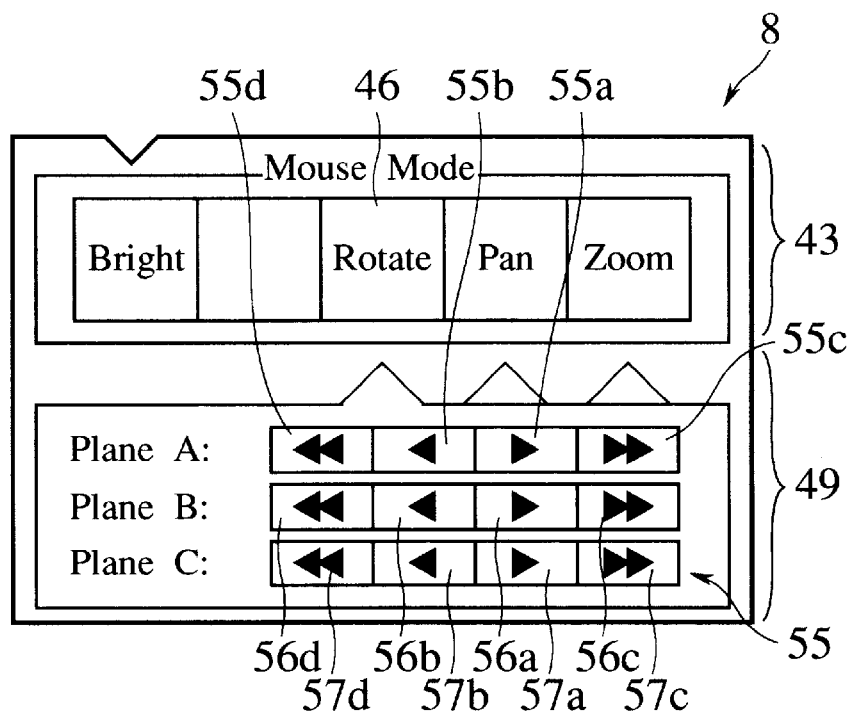
FIG. 12 is a drawing explaining a displayed direction changing key displayed in the mouse mode area when a display direction of the pick-up images displayed on the image display section is changed.

As the mouse mode selecting keys 43, a bright mode specifying key 44 shown in FIG. 10 for specifying a bright mode adjusting a window width and a window level, a fit mode display key 45 displayed at the time of a point fit mode and surface fit mode shown in FIG. 11 for aligning the respective images in the base area 3 and match area 4, and a display direction changing mode specifying key 46 shown in FIG. 12 for specifying a display direction changing mode changing display directions of the respective images in the base area 3 and match area 4 are provided.

Figure 13:
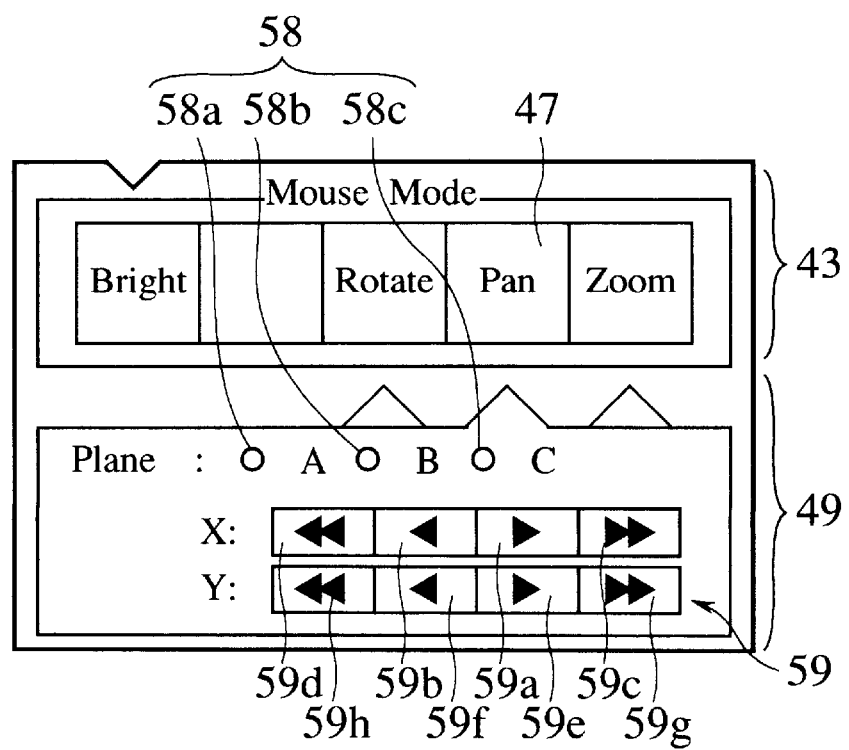
FIG. 13 is a drawing explaining the display direction changing keys displayed in the mouse mode area when a display position of the images displayed on the image display section is changed.
Figure 14:
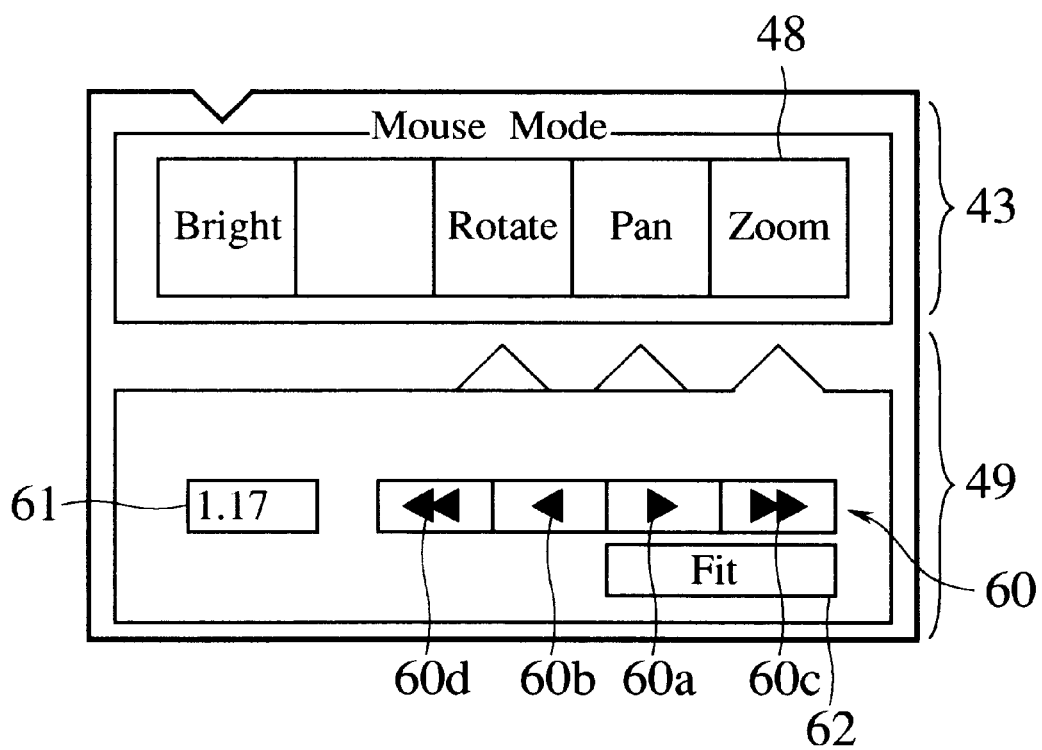
FIG. 14 is a drawing explaining zoom rate changing keys displayed in the mouse mode area when a zoom rate of the images displayed on the image display section is changed.

In addition, as the mouse mode selecting keys 43, a display position changing mode specifying key 47 shown in FIG. 13 for specifying a display position changing mode changing display positions of the respective images in the base area 3 and match area 4, a zoom rate changing mode specifying key 48 shown in FIG. 14 for specifying a zoom rate changing mode changing zoom rates of the respective images in the base area 3 and match area 4 are provided.

Figure 15A:
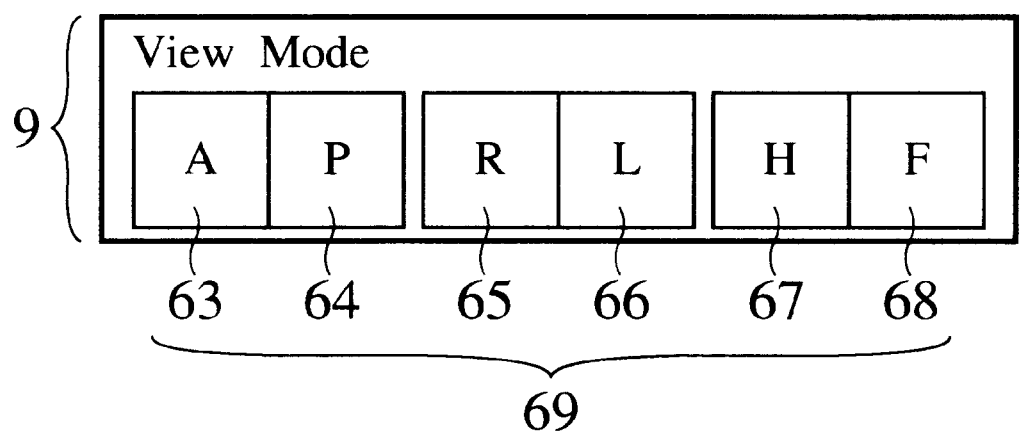
FIGS. 15A and 15B are drawings explaining a view mode area of the operation panel.
Figure 15B:
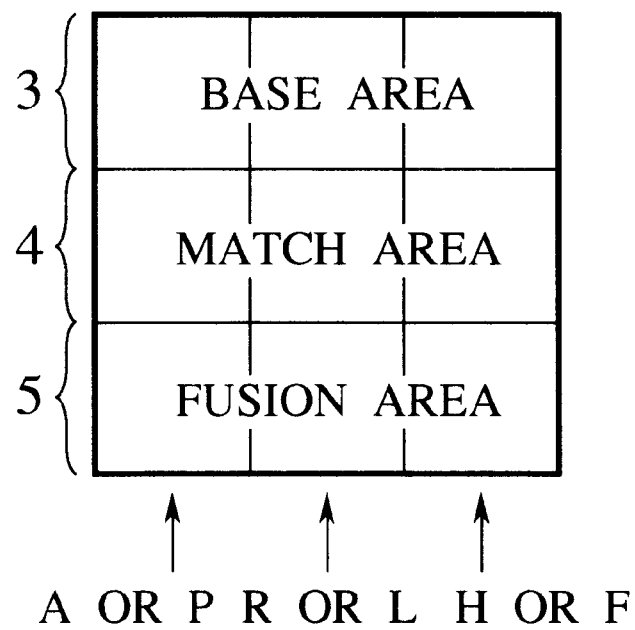

As shown in FIGS. 15A and 15B, the view mode area 9 is provided with display direction specifying keys 69 for changing display directions of the areas 3, 4 and 5.

Figure 16:
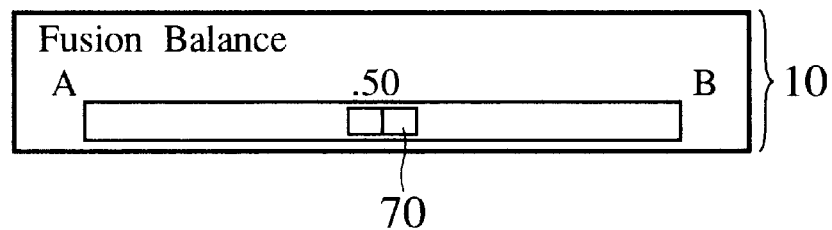
FIG. 16 is a drawing showing a fusion balance area of the operation panel.

As shown in FIG. 16, the fusion balance area 10 is provided with a density adjusting slider 70 for adjusting a density of the display image in the fusion area 5.

Figure 17:
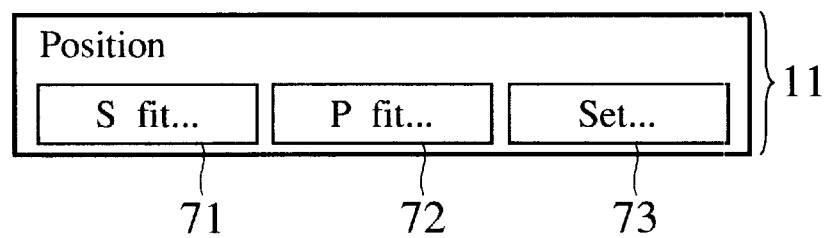
FIG. 17 is a drawing showing a position area of the operation panel.

As shown in FIG. 17, the position area 11 is provided with a surface fit key 71 for specifying that the respective images in the base area 3 and match area 4 are aligned by setting a region of interest (ROI), a point fit key 72 for specifying that the respective images in the areas 3 and 4 are aligned by setting fit points, and a set key 73 for specifying display of a dialogue box (FIG. 24) for displaying a rotation amount and panning amount calculated on a basis of an original display direction and display position of the image currently displayed in the match area.

The save area 12 is provided with a save key for specifying recording of the image currently displayed in the match area 4.

Figure 18:
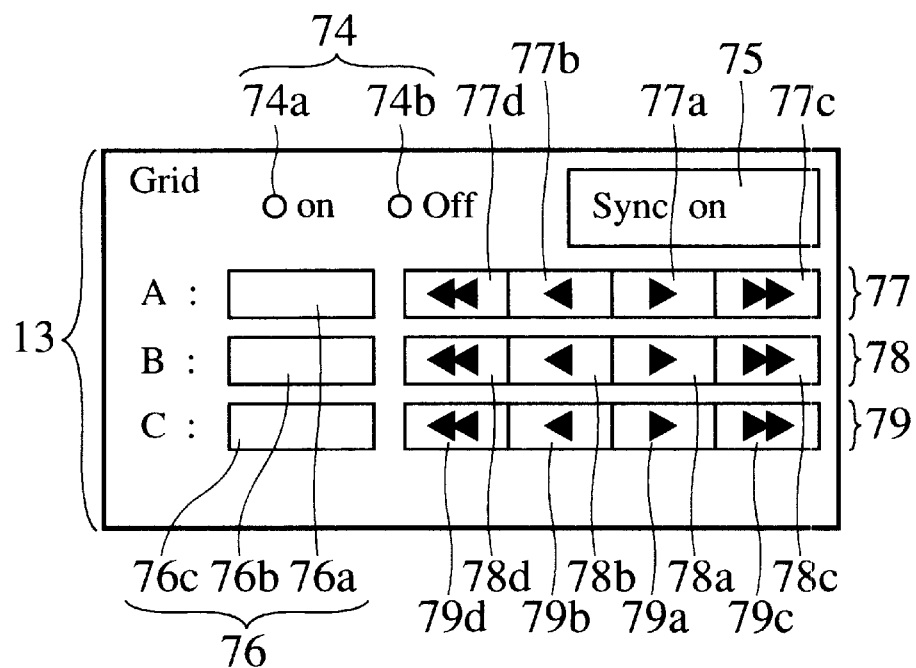
FIG. 18 is a drawing showing a grid area of the operation panel.

As shown in FIG. 18, the grid area 13 is provided with a cross-sectional cursor display/non-display selecting key for specifying display/non-display, etc. of a cross-sectional cursor to be displayed on a coaxial tomogram (MPR) when the coaxial tomogram is selected as a mode of an image to be displayed in the image display area in the rendering area 7 (FIG. 7A), a cursor moving condition switching key 75 for selecting as to whether or not the cross-sectional cursors displayed in the base area 3 and match area 4 are synchronized with each other and changed, a cursor position changing keys 77 through 79, etc. for specifying movements of the cross-sectional cursors.

Figure 3:
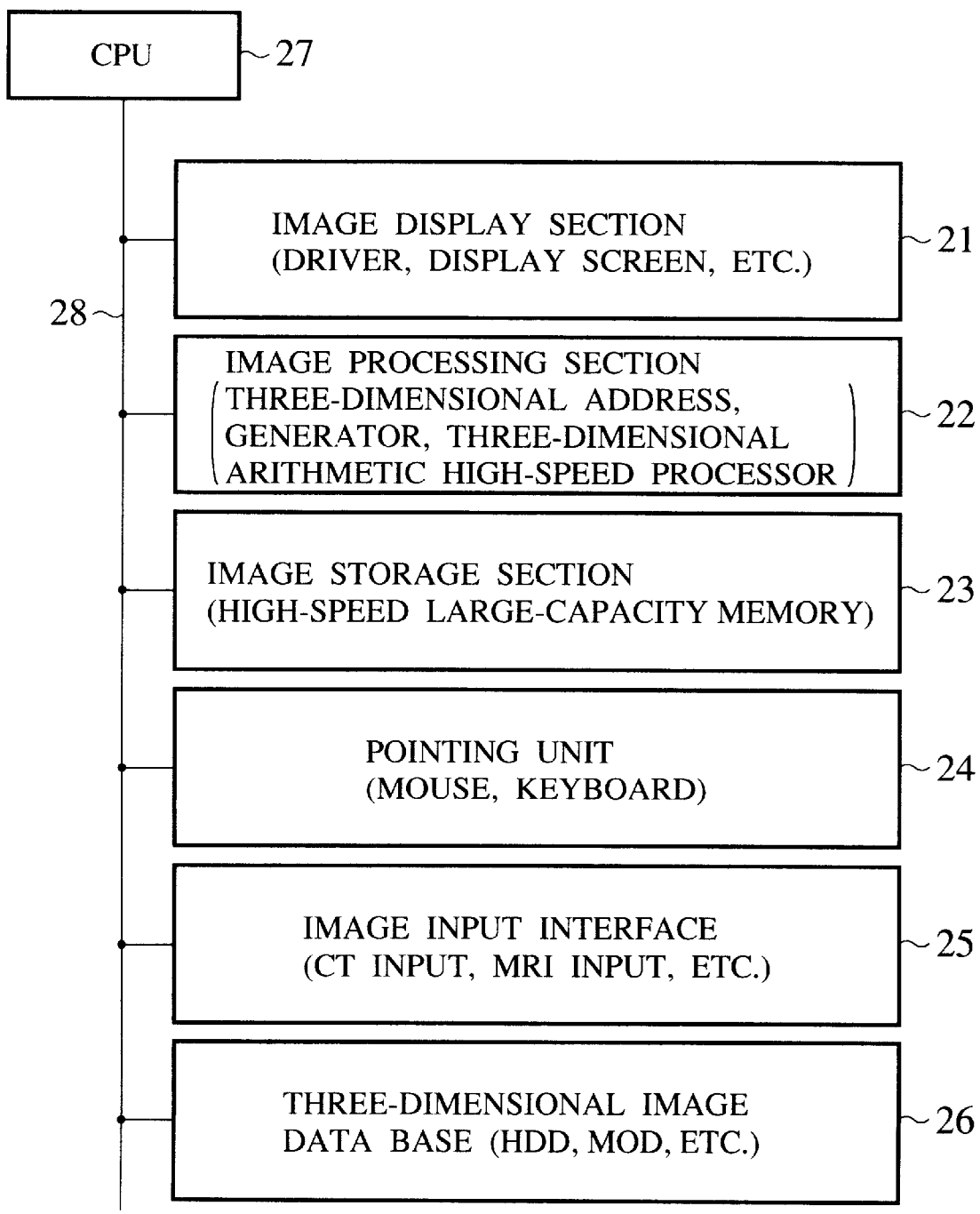
FIG. 3 is a block diagram of the medical image processing apparatus according to the embodiment of the present invention.

An electrical configuration of such a medical image processing apparatus is shown in FIG. 3, and it has an image display section 21 composed of a monitor unit for displaying images, operation panel, etc. in the above areas, a driver, etc., an image processing section 22 for forming a three-dimensional pseudo image based on a plurality of two-dimensional images imaged by the modalities such as the X-ray CT apparatus and MRI apparatus so as to display the three-dimensional image on the image display section 21, and an image storage section 23 for storing a plurality of the two-dimensional images imaged by the modalities thereinto when the three-dimensional image is formed.

In addition, the medical image processing apparatus has a pointing device 24 such as a mouse and keyboard for operating the operation panel displayed in the operation panel display area 2, an image input interface 25 for inputting and outputting a plurality of the two-dimensional images imaged by the modalities such as the X-ray CT apparatus and MRI apparatus, a three-dimensional image data base 26 for storing a plurality of the two-dimensional images, etc. imaged by the modalities thereinto, and a central control unit (CPU) 27 for controlling the whole of the medical image processing apparatus.

The respective sections 21 through 26 are connected to the CPU 27 via a bus line 28, and the CPU 27 communicates with the respective sections 21 through 26 via the bus line 28 and at the same time controls the whole of the medical image processing apparatus.

The following describes an operation of the medical image processing apparatus according to the present embodiment having the above arrangement.

First, image data as comparative objects are captured from the modalities. The image data are captured through the image input interface shown in FIG. 3, and when coaxial tomogram data are supplied from the different modalities such as the X-ray CT apparatus and MRI apparatus via the image input interface 25, the CPU 27 controls the three-dimensional image data base 26 so that the three-dimensional image data base 26 stores the coaxial tomogram data respectively into storage regions which have been allocated for each unit.

Header data such as the name of an imaging apparatus (name of modality), the identification number of a patient (patient's ID), the name of a patient, an image No., an imaged date, an imaged time, an imaged position, the date of patient's birth, sex, an imaged pose and an imaged portion are added to the coaxial tomogram data, and when a patient's ID and name, etc. displayed in the list are selected, the image can be specified and read out.

In addition, in the medical image processing apparatus, coaxial tomogram data for plural pieces are captured as the coaxial tomogram data, and a three-dimensional pseudo image is formed based on the coaxial tomogram data for plural pieces in the image processing section 22, mentioned later, so as to be displayed on the image display section 21.

Next, when respective coaxial tomogram data from the modalities using different imaging methods are stored into the three-dimensional image data base 26, an operator operates the pointing apparatus 24 so as to select ID or (and) name of a patient to be diagnosed according to the comparison of the data, and a modality.

After input, the CPU 27 compares IDs or (and) names of two patients inputted per modality with each other, and when the both coincide with each other, the CPU 27 waits for reading of the respective image data.

In addition, when the both do not coincide with each other, the CPU 27 controls the image display section 21 so that a warning message such that "the patient's IDs (or names) do not coincide. Continue the process? YES NO" is displayed. Then, when "NO" on the display screen is clicked by the pointing unit 24, input of a patent's ID, etc. is required again. Moreover, when "YES" on the display screen is clicked, the CPU 27 waits for reading of the image data.

As a result, it is previously prevented by comparing coaxial tomograms of different patients with each other that inconvenience such that a wrong diagnosis is made, and thus accuracy and safety of a diagnosis by the medical image processing apparatus can be obtained.

Here, the comparison of the images of different IDs (the comparison of the images of different patients) is effective in observing a difference in diagnosis portions between a healthy patient and a patient in bad condition. For this reason, in the medical image processing apparatus, even if the patient's IDs do not coincide with each other, when execution command is executed ("YES" is clicked), the process is continued.

Next, when the coaxial tomogram data of the respective modalities are stored into the three-dimensional image data base 26, the operator selects a display format.

More specifically, as shown in FIG. 4, the control area 6 in the operation panel display area 2 is provided with a display specifying key 30 composed of a one-section display key 31 and a 9-section display key 32. When one desired image is desired to be displayed in the image display area 1, the one-section display key 31 is clicked by the mouse of the pointing unit 24, and a study selecting key 33 is clicked so that an image for one-section display is specified in the base area 3, match area 4 or fusion area 5.

In addition, when images of three poses by the respective modalities are desired to be displayed in the base area 3 and match area 4 of the image display area 1, and a fusion image of the images of the respective poses by the respective modalities is desired to be displayed in the fusion area 5, the 9-section display key 31 is clicked by the mouse.

The study selecting key 33 is composed of a base image selecting key (Base) 34 for specifying one-section display of an image (base image) in the base area 3, a match image selecting key (Match) 35 for specifying one-section display of an image (match image) in the match area 4, and a fusion image selecting key (Fusion) 36 for specifying one-section display of an image (fusion image) in the fusion area 5. When one-section display is specified, the CPU 27 controls the display of one-section image corresponding to clicked one of the selecting keys 34 through 36.

Figure 5:
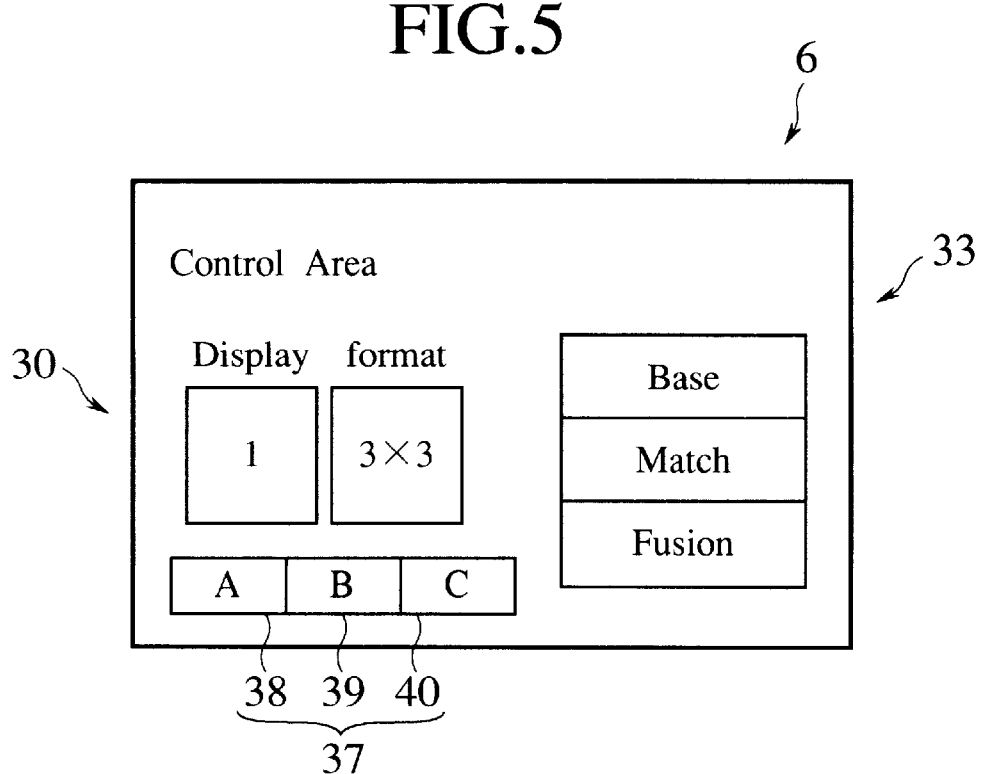
FIG. 5 is a drawing explaining display image selecting keys for specifying a display direction of images displayed on the control area.

In other words, the CPU 27 detects that the one-section display key 31 is clicked, and controls display of a display format selecting key 37 in the lower part of the one-section display key 31 and 9-section display key 32 as shown in FIG. 5.

The display format selecting key 37 is composed of totally three keys, i.e., first through third display format specifying keys (A through C) 38 through 40. When the first display format specifying key (A) 38 is clicked in an MPR display mode for displaying a coaxial tomogram, the CPU 27 controls display of a coronal image of the image selected by the study selecting key 33, and when the second display format specifying key (B) 39 is clicked in the MPR display mode, the CPU 27 controls display of a sagital image of the image selected by the study selecting key 33, and when the third display format specifying key (C) 40 is clicked in the MPR display mode, the CPU 27 controls display of an axial image of the image selected by the study selecting key 33.

In addition, when the first display format specifying key (A) 38 is clicked in a surface display mode for display a surface image, the CPU 27 controls display of an image in a front direction or rear direction of the image selected by the study selecting key 33, and when the second display format specifying key (B) 39 is clicked in the surface display mode, the CPU 27 controls display of an image in a right direction or left direction of the image selected by the study selecting key 33, and when the third display format specifying key (C) 40 is clicked in the surface display mode, the CPU 27 controls display of an image in a head-to-foot direction or foot-to-head direction of the image selected by the study selecting key 33.

Meanwhile, when the 9-section display key 32 is clicked, the CPU 27 detects it, and controls display of the display format selecting key 37 in the lower part of the one-section display key 31 and 9-section display key 32 in the similar manner to the aforementioned case where the one-section display key 31 is clicked.

When the display format selecting key 37 is displayed, the operator clicks the display format specifying keys (A through C) 38 through 40 so as to select a display format of the image to be displayed in the base area 3, match area 4 and fusion area 5.

Figure 6:
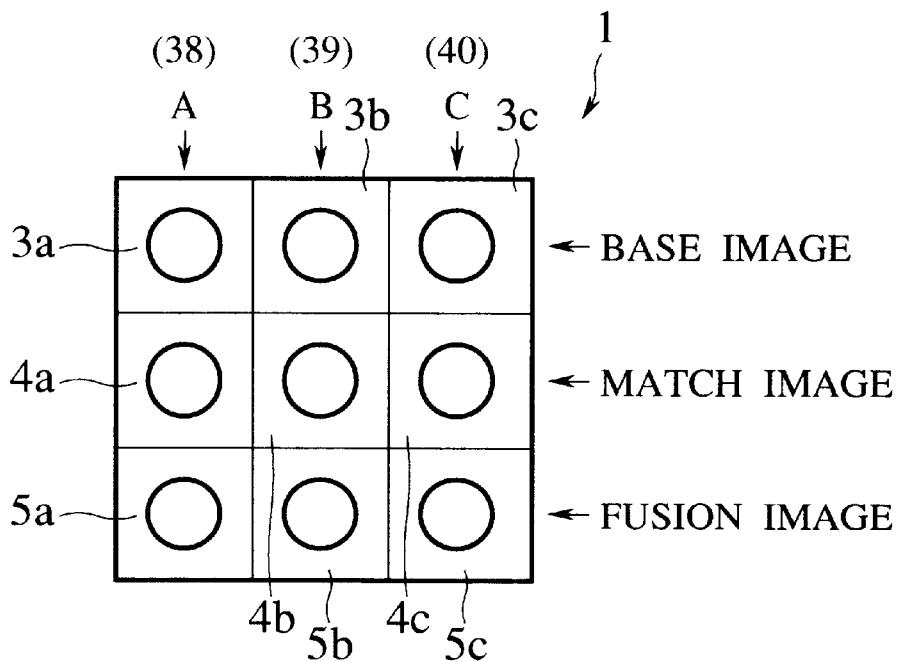
FIG. 6 is a drawing explaining the display directions of 9 sections of the images displayed on the image display section variable by the display image selecting key.

As shown in FIG. 6, when the first display format specifying key (A) 38 is clicked in the MPR display mode, the CPU 27 controls display of the coronal images of the base image in the base area 3, the match image in the match area 4 and the fusion image in the fusion area 5 in a left file (3a, 4a and 5a) in each area 3 through 4. When the second display format specifying key (B) 39 is clicked in the MPR display mode, the CPU 27 controls display of sagital images of the base image, match image and fusion image in a middle file (3b, 4b and 5b) in each area 3 through 4. When the third display format specifying key (C) 40 is clicked in the MPR display mode, the CPU 27 controls display of axial images of the base image, match image and fusion image in a right file (3c, 4c and 5c) in each area 3 through 4.

In addition, when the first display format specifying key (A) 38 is clicked in the surface display mode for displaying a surface image, the CPU 27 controls display of images in the front or rear direction of the base image, match image and fusion image in the left file (3a, 4a and 5a) in each area 3 through 4. When the second display format specifying key (B) 39 is clicked in the surface display mode, the CPU 27 controls display of images in right or left direction of the base image, match image and fusion image in the middle file (3b, 4b and 5b) in each area 3 through 4. When the third display format key (C) 40 is clicked in the surface display mode, the CPU 27 controls display of images in the head-to-foot or foot-to-head direction of the base image, match image and fusion image in the right file (3c, 4c and 5c) in each area 3 through 4.

Here, when the 9-section display key 32 is clicked, a study cannot be selected by the study selecting key 33.

Next, when the selection of the display format, etc. is completed, the operator selects the display mode of an image to be display in the image display area 1 using the display mode switching key 41 provided to the rendering area 7 shown in FIGS. 7A and 7B in the operation panel display area 2.

At the initial setting, the CPU 27 automatically selects the display mode (MPR display mode) of a coaxial tomogram (MPR) as shown in FIG. 7A, and controls display of a word "MPR" on the display mode switching key 41 in the rendering area 7.

In the case where the display mode initially set is switched to the display mode (surface display mode) of a surface image (Surface), the operator clicks the display mode switching key 41 using the mouse. After this clicking, the CPU 27 controls display of a word "Surface" on the display mode switching key 41 as shown in FIG. 7B, and at the same time controls display of a threshold setting key 42 (threshold) so as to switch the display mode.

In the medical image processing apparatus, when the surface image mode is selected, a three-dimensional pseudo image formed by a "Voxel method", mentioned later, is displayed. When a three-dimensional image is formed by the Voxel method, the threshold setting key 42 inputs a threshold value of a CT value in the case where the modality is the X-ray CT apparatus, for example, and inputs a threshold value of a proton value in the case where the modality is the MRI apparatus.

When the threshold setting key 42 is clicked, the CPU 27 forms and displays an input panel for inputting a threshold value. Then, an image having a CT value of not more than the threshold value (or not less than the threshold value) inputted to the input panel is formed and displayed. As a result, it is possible to obtain a desired surface image such as a surface image of only a skeleton.

In the medical image processing apparatus, the respective images of the one-section display or 9-section display are displayed in a form of three-dimensional pseudo images based on a plurality of the two-dimensional coaxial tomograms by the modalities stored in the three-dimensional image data base 26.

The three-dimensional pseudo images displayed in the surface display mode are formed based on the Voxel method by the image processing section 22 shown in FIG. 3, and when reading out the coaxial tomogram of the patient specified by the patient's ID, etc. by the modality from the three-dimensional image data base 26, the CPU 27 supplies the coaxial tomogram to the image processing section 22.

Here, as the coaxial tomogram, in the case where the modality is the X-ray CT apparatus, for example, a CT value is read out, and in the case of the MRI apparatus, a proton value is read out.

The image processing section 22 is composed of a three-dimensional address generator and a three-dimensionally arithmetic high-speed processor having a high-speed image processing function such as a three-dimensional space filter and a three-dimensionally logical filter and having a high-speed graphics function such as a hidden line, hidden-surface process, lightness calculation and projection conversion.

When CT values as the respective coaxial tomograms are supplied in the case where the modality is the X-ray CT apparatus, the image processing section 22 filters the CT values using the three-dimensional space filter so as to improve image quality as well as binarizes the CT values according to the threshold value set by the threshold setting key 42 shown in FIG. 7.

The three-dimensionally arithmetic high-speed processor controls writing of the binarized coaxial tomograms into the image storage section 23 which is a high-speed large-capacity memory so that the coaxial tomograms are laminated in the order of the image numbers (in the order of slicing number). As a result, a three-dimensional pseudo image is formed by the Voxel method on the image storage section 23.

After the three-dimensional image is formed on the image storage section 23 in such a manner, when the display format selecting key 37 mentioned referring to FIG. 5 is operated, the CPU 27 supplies data representing the selected display format into the image processing section 22.

The three-dimensional address generator of the image processing section 22 calculates an address at a high speed according to the selected display format, and transfers the address data to the three-dimensionally arithmetic high-speed processor at a high speed. When the three-dimensionally arithmetic high-speed processor reads out the three-dimensional pseudo image stored in the image storage section 23 based on the address data and performs parallel processing and pipeline processing on the three-dimensional pseudo image, the three-dimensionally arithmetic high-speed processor forms the three-dimensional image of the selected display format at high speed and supplies it to the image display section 21.

As a result, as mentioned referring to FIG. 5, the surface image in the front or rear direction (the first display format specifying key 38) selected by the display format selecting key 37, the surface image in the right or left direction (the second display format specifying key 39), or the surface image in the head-to-foot or foot-to-head direction (the third display format specifying key 40) can be displayed on the image display section 21.

Here, the image to be displayed in the surface display mode may be formed by, for example, a wire frame method of extracting outlines of an internal organ, etc. for the respective coaxial tomograms as charts and composing a surface by connecting the outlines like mesh, a surface method of painting over the mesh surface and displaying it with a smooth shadow, etc. besides the Voxel method.

Next, in the medical image processing apparatus of the present invention, in the MPR display mode, the three-dimensional address generator and three-dimensionally arithmetic high-speed processor in the image processing section 22 interpolate a density value according to a coordinate by the neighbor arithmetic based on the three-dimensional pseudo image stored in the image storage section 23, and form a coaxial tomogram of the display format selected by the display format selecting key 37.

As a result, a coronal image, sagital image or axial image is formed according to the display format selected by the display format selecting key 37 and can be displayed on the image display section 21.

Next, when the 9-section display is executed according to the arbitrary display format in such a manner, the operator operates the mouse mode area 8 so as to change a window value of the base area 3 and match area 4 (window width and window level of the display screen), to set fit points for aligning the base image with the match image, to set region of interest (ROI) for alignment, and to turn the display image, parallel transfer the display image, and change a zoom rate of the display image.

Figure 8:
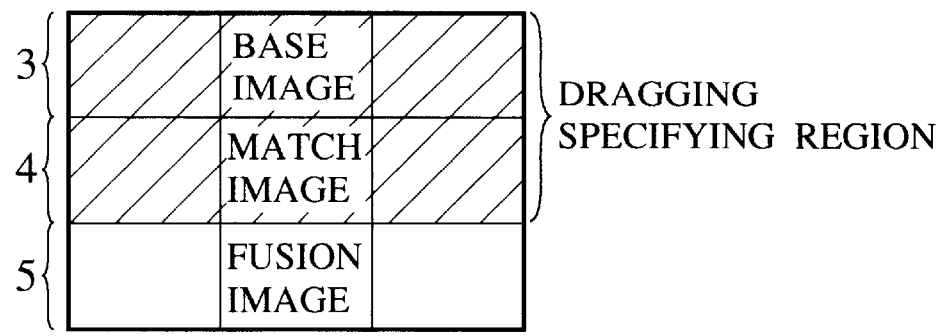
FIG. 8 is a drawing explaining an image display area which can be controlled by dragging with a mouse.
Figure 9A:
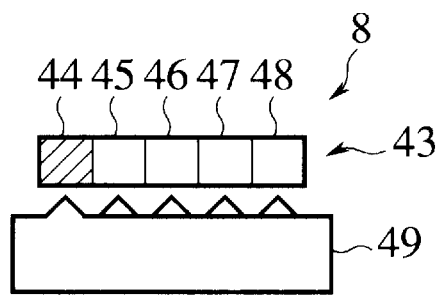
FIG. 9 is a drawing explaining a relationship between an operation in a mouse mode area of the operation panel and the display panel.
Figure 9B:
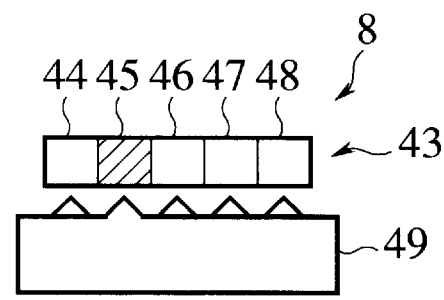
Figure 9C:
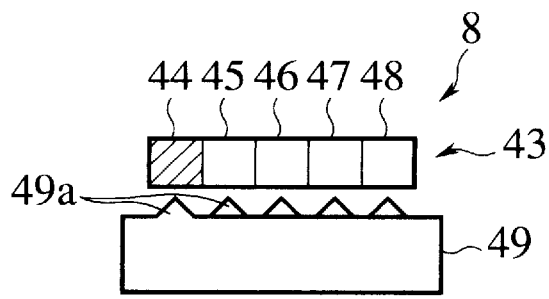
Figure 9D:
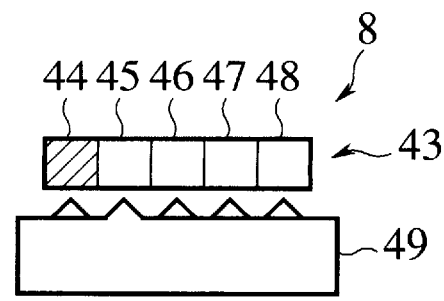

In the mouse mode area 8, as shown in FIG. 8, the respective images in the base area 3 and the match area 4 can be operated, and a fusion image according to the operation in each area 3 and 4 is displayed in the fusion area 5.

In addition, on the mouse mode area 8, as shown in FIG. 9, the mouse mode specifying keys 43, which is composed of a bright mode specifying key 44, a fit mode display key 45, a display direction changing key 46, a display position changing key 47 and a zoom rate changing mode specifying key 48, and a display panel 49 are displayed.

On the display panel 49, a panel having contents according to the respective modes allocated to the keys 44 through 48 operated by the operator is displayed. Moreover, the display panel 49 is provided with tags 49a whose number corresponds with the number of the keys 44 through 48, when the operator operates the tags 49a, only the content of the panel is switched with the mode being unchanged.

Namely, when the window width and window level in the base area 3 or match area 4 are adjusted, the operator clicks the bright mode specifying key 44 shown in FIG. 10 in the mouse mode area 8. When the bright mode specifying key 44 is clicked, the CPU 27 controls display of a window adjusting panel shown in FIG. 10 on the display panel 49.

On the window adjusting panel, a target area selecting key 50 for selecting an image (area) whose window is to be adjusted, a window width changing key 51, a window width changing slider 52, a window level changing key 53, a window level changing slider 54, and key input display sections 52a and 54a are displayed.

As the target area selecting key 50, a base area selecting key 50a and a match area selecting key 50b for selecting an area whose window is to be adjusted are provided, and the CPU 27 recognizes an area selected by the keys 50a and 50b as the area whose window is to be adjusted.

The window width changing key 51 adjusts window widths of the areas 3 and 4, and when a feed key 51a is operated, the CPU 27 controls the window selected by the target area selecting key 50 so that the window width is widened according to the operating time. When the back feed key 51b is operated, the CPU 27 controls the window selected by the target area selecting key 50 so that the window width is narrowed according to the operating time.

In addition, when a quick-feed key 51c is operated, the CPU 27 controls the window selected by the target area selecting key 50 so that the window width is widened quickly according to the operating time, and when a quick-back feed key 51d is operated, the CPU 27 controls the window selected by the target area selecting key 50 so that the window width is narrowed quickly according to the operating time.

The window width can be changed by the window width changing slider 52 or direct key input, and in the case where the window width is changed by the window width changing slider 52, the operator drags the slider 52 in the right or left direction using the mouse.

When the slider 52 is dragged in the right direction, the CPU 27 controls the window so that the window width is widened according to the dragging amount, and when the slider 52 is dragged in the left direction, the CPU 27 controls the window so that the window width is narrowed according to the dragging amount.

When the window width is changed by the window width changing key 51 or window width changing slider 52, the CPU 27 controls display of a numerical value representing the current window width on the key input display section 52a. As a result, the operator can recognize the current window width by the numerical value.

In addition, in the case where the window width is changed by direct key input, the operator directly writes its numerical value into the key input display section 52a by key input. When the window width is written into the key input display section 52, the CPU 27 controls display so that the window width corresponding to the numerical value is obtained.

Next, the window level changing key 53 adjusts the window levels in the areas 3 and 4, and when a feed key 53a is operated, the CPU 27 controls the window selected by the target area selecting key 50 so that the window level is risen according to the operating time. When a back feed key 53b is operated, the CPU 27 controls the window selected by the target area selecting key 50 so that the window level is lowered according to the operating time.

In addition, when a quick-feed key 53c is operated, the CPU 27 controls the window selected by the target area selecting key 50 so that the window level is risen quickly according to the operating time, and when a quick-back feed key 53d is operated, the CPU 27 controls the window selected by the target area selecting key 50 so that the window level is lowered quickly according to the operating time.

The window level may be changed by the window level changing slider 54 or direct key input, and in the case where the window level is changed by the window level changing slider 54, the operator drags the slider 54 in the right or left direction using the mouse.

When the slider 54 is dragged in the right direction, the CPU 27 controls display so that the window level is risen according to the dragging amount, and when the slider 54 is dragged in the left direction, the CPU 27 controls display so that the window level is lowered according to the dragging amount.

When the window level is changed by the window level changing key 53 or window level changing slider 54 in such a manner, the CPU 27 controls display of a numerical value representing the current window level on the key input display section 54a. As a result, the operator can recognize the current window level by the numerical value.

In addition, in the case where the window level is changed by the direct key input, the operator directly writes the numerical value into the key input display section 54a by the key input. When the window level is written into the key input display section 54a, the CPU 27 controls display so that the window level corresponding to the numerical value is obtained.

Next, in the medical image processing apparatus of the present invention, the images in the base area 3 or match area 4 can be aligned by setting fit points or ROI, the selection of the alignment between fit points and ROI is made by operating a point fit key 72 and a surface fit key 71 shown in FIG. 17. Then, when the point fit key 72 or surface fit key 71 is operated, the CPU 27 controls display of a fit mode display key 45 shown in FIG. 11. For this reason, the description of the fit mode display key 45 will be given later when the point fit key 72 or surface fit key 71 will be explained.

Next, in the case where the display direction of the images in the base area 3 or match area 4 is adjusted, the operator clicks the display direction changing mode specifying key 46 shown in FIG. 12 in the mouse mode area 8. When the display direction changing mode specifying key 46 is clicked, the CPU 27 controls display of a display direction adjusting panel shown in FIG. 12 on the display panel 49.

The display direction adjusting panel is provided with a display direction changing key 55 which is composed of a plane A key for changing the display direction of the left file in the image display area 1 shown in FIG. 6 (images A: respective images in the left file in the areas 3, 4 and 5), a plane B key for changing the display direction of the middle file in the image display area 1 (images B: respective images in the middle file in the areas 3, 4 and 5), and a plane C key for changing the display direction of the right file in the image display area 1 (images C: respective images in the right file in the areas 3, 4 and 5).

When a feed key 55a of the plane A key is operated, the CPU 27 controls display so that the images in the left file in the image display area 1 are rotated in the clockwise direction according to the operating time, and when a back feed key 55b is operated, the CPU 27 controls display so that the images in the left file in the image display area 1 are rotated in the counterclockwise direction according to the operating time.

In addition, when a quick-feed key 55c of the plane A key is operated, the CPU 27 controls display so that the images in the left file in the image display area 1 are rotated quickly in the clockwise direction according to the operating time, and when a quick-back feed key 55d is operated, the CPU 27 controls display so that the images in the left file in the image display area 1 are rotated quickly in the counterclockwise direction according to the operating time.

In addition, when a feed key 56a of the plane B key is operated, the CPU 27 controls control display so that the images in the middle file in the image display area 1 are rotated in the clockwise direction according to the operating time, and when a back feed key 56b is operated, the CPU 27 controls display so that the images in the middle file in the image display area 1 are rotated in the counterclockwise direction according to the operating time.

In addition, when a quick-feed key 56c of the plane B key is operated, the CPU 27 controls display so that the images in the middle file in the image display area 1 are rotated quickly in the clockwise direction according to the operating time, and when a quick-back feed key 56d is operated, the CPU 27 controls display so that the images in the middle file in the image display area 1 are rotated quickly in the counterclockwise direction according to the operating time.

In addition, when a feed key 57c of the plane C key is operated, the CPU 27 controls display so that the images in the right file in the image display area 1 are rotated in the clockwise direction according to the operating time, and when a back feed key 57b is operated, the CPU 27 controls display so that the images in the right file in the image display area 1 are rotated in the counterclockwise direction according to the operating time.

In addition, when a quick-feed key 57c of the plane C key is operated, the CPU 27 controls display so that the images in the right file in the image display area 1 are rotated quickly in the clockwise direction according to the operating time, and when a quick-back key 57d is operated, the CPU 27 controls display so that the images in the right file in the image display area 1 are rotated quickly in the counterclockwise direction according to the operating time.

Here, in the adjustment of the rotating direction, the three-dimensional address generator and three-dimensionally arithmetic high-speed processor in the image processing section 22 calculates three-dimensional pseudo images stored in the image storage section 23 at high speed according to the rotating directions, and supplies the three-dimensional pseudo images to the image display section 21 so as to display the images in the respective directions.

Next, in the case where the display positions of the images in the areas 3, 4 and 5 are adjusted, the operator clicks the display position changing mode specifying key 47 shown in FIG. 13 in the mouse mode area 8. When the display position changing mode specifying key 47 is clicked, the CPU 27 controls display of a display position adjusting panel shown in FIG. 13 on the display panel 49.

The display position adjusting panel is provided with a panning plane selecting key 58 for changing the display positions of the images in the left, middle and right files in the image display area 1, and a panning direction specifying key 59 for controlling panning of the images in the up-and-down and right-and-left directions.

The panning plane selecting key 58 is provided with a plane A selecting key 58a for selecting plane A in the left file as images to be panned, a plane B selecting key 58b for selecting plane B in the middle file as images to be panned, and a plane C selecting key 58c for selecting plane C in the right file as images to be panned. The CPU 27 recognizes the plane specified by the clicked one of the selecting keys 58a through 58c as plane to be panned.

Then, when a right direction specifying key 59a is operated, the CPU 27 controls display so that the match image in the match area 3 of the plane selected by one of the selecting keys 58a through 58c is panned in the right direction according to the operating time, and after the panning of the match image, the CPU 27 controls display so that fusion image is panned accordingly.

In addition, when a left direction specifying key 59b is operated, the CPU 27 controls display so that the match image in the match area 3 of the plane selected by one of the selecting keys 58a through 58c is panned in the left direction according to the operating time, and after the panning of the match image, the CPU 27 controls display so that fusion image is panned accordingly.

In addition, when a high-speed right direction specifying key 59c is operated, the CPU 27 controls display so that the match image in the match area 3 of the plane selected by one of the selecting keys 58a through 58c is panned in the right direction at high speed according to the operating time, and the CPU 27 controls display so that fusion image is panned according to the panning of the match image.

In addition, when a high-speed left direction specifying key 59d is operated, the CPU 27 controls display so that the match image in the match area 3 of the plane selected by one of the selecting keys 58a through 58c is panned in the left direction at high speed according to the operating time, and the CPU 27 controls display so that fusion image is panned according to the panning of the match image.

In addition, when an up direction specifying key 59e is operated, the CPU 27 controls display so that the match image in the match area 3 of the plane selected by one of the selecting keys 58a through 58c is panned in the up direction according to the operating time, and the CPU 27 controls display so that fusion image is panned according to the panning of the match image.

In addition, when a low direction specifying key 59f is operated, the CPU 27 controls display so that the match image in the match area 3 of the plane selected by one of the selecting keys 58a through 58c is panned in the low direction according to the operating time, and the CPU 27 controls display so that fusion image is panned according to the panning of the match image.

In addition, when a high-speed up direction specifying key 59g is operated, the CPU 27 controls display so that the match image in the match area 3 of the plane selected by one of the selecting keys 58a through 58c is panned in the up direction at high speed according to the operating time, and the CPU 27 controls display so that fusion image is panned according to the panning of the match image.

In addition, when a high-speed down direction specifying key 59h is operated, the CPU 27 controls display so that the match image in the match area 3 of the plane selected by one of the selecting keys 58a through 58c is panned in the down direction at high speed according to the operating time, and the CPU 27 controls display so that fusion image is panned according to the panning of the match image.

As a result, the images of the respective planes can be panned in desired positions.

In addition, the images of the respective planes A through C can be panned also by dragging the match images in the match area 3 by the operator.

In the case where the image is panned by dragging, the operator drags the match image in the match area 3 of desired plane in the up-and-down or right-and-left direction. The CPU 27 recognizes the dragged plane as plane to be panned, and controls display so that the match image of the dragged plane is panned in the up-and-down or right-and-left direction. After the operator performs an off-operation on the mouse button, the CPU 27 controls display so that the fusion image of the plane is also panned accordingly.

As a result, the images of the respective planes can be panned to desired positions.

Next, in the case where zoom rates of the images in the areas 3, 4 and 5 are adjusted, the operator clicks the zoom rate changing mode specifying key 48 shown in FIG. 14 in the mouse mode area 8. When the zoom rate changing mode specifying key 48 is clicked, the CPU 27 controls display of a zoom rate adjusting panel shown in FIG. 14 on the display panel 49.

The zoom rate adjusting panel is provided with a zoom rate changing key 60 for changing zoom rates of images, a zoom rate display input section 61 for displaying a current zoom rate and directly inputting a desired zoom rate through a key, and a fit key 62 for displaying images according to zoom rates along sizes of the respective areas.

When the images in one of the areas 3, 4 and 5 are selected and a zoom-in key 60a of the zoom rate changing key 60 is clicked, the CPU 27 controls display so that the images in the selected area are gradually zoomed in according to the operating time, and when a zoom-out key 60 is clicked, the CPU 27 controls display so that the images in the selected area are gradually zoomed out according to the operating time. Moreover, when a high-speed zoom-in key 60c of the zoom rate changing key 60 is clicked, the CPU 27 controls display so that the images in the selected area are zoomed in at high speed according to the operating time, and when a high-speed zoom-out key 60d is clicked, the CPU 27 controls display so that the images in the selected area are zoomed out at high speed according to the operating time.

When the zoom rate of the images is changed, the CPU 27 displays the current zoom rate of the images on the zoom rate display input section 61.

As a result, the operator can adjust the zoom rates of the images while recognizing the current zoom rates.

In addition, in the medical image processing apparatus of the present invention, the zoom rate of the images can be adjusted also by direct key input. In this case, the operator selects an image whose zoom rate is to be changed, and inputs a desired zoom rate into the zoom rate display input section 61 using the keyboard, etc. When the zoom rate is inputted, the CPU 27 controls display of the selected image according to the inputted zoom rate.

In addition, the zoom rate of the images can be changed also by dragging by the operator.

In the case where the zoom rate of the images are changed by dragging, the operator moves the cursor to a desired image (base image, match image and fusion image), and in this state, drags the mouse in the right or left direction. The CPU 27 recognizes the image currently indicated by the cursor as an image whose zoom rate is to be changed, and when image is dragged in the right direction, the CPU 27 displays the image which has been enlarged according to the dragging amount, and when the image is dragged in the left direction, the CPU 27 controls display of the image which has been zoomed out according to the dragging amount.

Further, in the medical image processing apparatus of the present invention, the images can be displayed with zoom rates according to sizes of the display regions 3a through 3c, 4a through 4c and 5a through 5c of the images. In this case, the operator selects images in the desired display regions 3a through 3c, 4a through 4c and 5a through 5c and clicks a fit key 62.

When the fit key 62 is clicked, the CPU 27 controls display of the selected images having sizes according to the display regions. As a result, the sizes of the display images can be adjusted to the most suitable sizes with one touch of the fit key 62, and thus the convenience of the medical image processing apparatus can be improved.

In the medical image processing apparatus of the present invention, since the zoom rate of the images can be adjusted, the base images and match images imaged by different modalities can be adjusted and composed so as to be displayed with the same size. For this reason, a diagnosis can be made based on a fusion image which has been formed by adjusting the comparing objects (base images and match images) to the same size, and the accuracy of the diagnosis can be obtained.

Next, the changes in the display directions and display positions using the display direction changing mode specifying key 46 and display position changing mode specifying key 47 can be applied to the subtle adjustment in the display direction, but in the medical image processing apparatus, usually the images in the areas 3 through 5 can be displayed automatically in the display direction which is usually used.

Namely, the display direction is specified in the view mode area 9 shown in FIG. 15A in the operation panel display area 2.

The view mode area 9 is provided with display direction specifying keys 69 which are composed of a front display key 63 for specifying display of images in the front direction (A), a rear display key 64 for specifying display of images in the rear direction (P), a right side display key 65 for specifying display of images in the right side direction (R), a left side display key 66 for specifying display of images in the left side direction (L), a head display key 67 for specifying display of images in the head-to-foot direction (H), and a foot display key 68 for specifying display of images in the foot-to-head direction (F).

As shown in FIG. 15B, the front display key 63 and rear display key 64 specify the display direction of the images in the left file in the areas 3 through 5. When the front display key 63 is clicked, the CPU 27 controls display of the images in the left file in the areas 3 through 5 to be displayed in the front direction, and when the rear display key 64 is clicked, the CPU 27 controls display of the images in the left file in the areas 3 through 5 to be displayed in the rear direction.

In addition, as shown in FIG. 15B, the right side display key 65 and left side display key 66 specify the display direction of the images in the middle file in the areas 3 through 5. When, the right side display key 65 is clicked, the CPU 27 controls display of the images in the middle file in the areas 3 through 5 to be displayed in the right side direction, and when the left side display key 66 is clicked, the CPU 27 controls display of the images in the middle file in the areas 3 through 5 to be displayed in the left side direction.

In addition, as shown in FIG. 15B, the head display key 67 and foot display key 68 specify the display direction of the images in the right file in the areas 3 through 5. When the head display key 67 is clicked, the CPU 27 controls display of the images in the right file in the areas 3 through 5 to be displayed in the head-to-foot direction, and when the foot display key 68 is clicked, the CPU 27 controls display of the images in the right file in the areas 3 through 5 to be displayed in the foot-to head direction.

The automatic control of the display directions of the images are made based on the imaging position (imaging direction) and imaging pose which are added as header data to the coaxial tomogram data of the image data.

Namely, on the image storage section 23 shown in FIG. 3, as mentioned above, a three-dimensional pseudo image is formed and stored based on the imaging positions (imaging directions) and imaging poses of the respective two-dimensional coaxial tomograms. For this reason, the CPU 27 can previously recognize the imaging direction of the three-dimensional image formed on the image storage section 23, and when the right side display key 65, for example, is clicked, the CPU 27 controls the image processing section 22 so that image in the right side direction is formed from the three-dimensional image based on the recognized imaging direction.

As a result, an image in a direction specified by the keys 63 through 68 can be displayed automatically.

Here, in the case where the image data do not have data of the imaging positions (imaging directions) and imaging poses, the CPU 27 recognizes the direction of the coaxial tomogram as the head-to-foot direction, and controls display of the image in the specified direction accordingly.

Next, the display density of a fusion image, which has been formed based on the base image and match image whose display direction and display position and zoom rate are adjusted, can be adjusted by a density adjusting slider 70 provided to the fusion balance area 10 shown in FIG. 16 in the operation panel display area 2.

In the case where the operator sees the fusion images and wants to enhance the match images (in the case where the operator wants to obtain fusion images where density of the match images has been increased), the operator moves the density adjusting slider 70 in the right direction using the mouse. Moreover, in the case where the operator wants to enhance the base images (in the case where the operator wants to obtain fusion images where density of the base images has been increased), the operator moves the density adjusting slider 70 in the left direction using the mouse.

In the initial setting state, the CPU 27 displays the respective fusion images of the respective match images and base images with the same density, and controls display of the density adjusting slider 70 on a center position of the move region. However, when the density adjusting slider 70 is moved in the right direction by the operator, the CPU 27 forms and displays the fusion images where the density of the match images has been increased according to the moved amount. Moreover, when the density adjusting slider 70 is moved in the left direction, the CPU 27 detects it and forms and displays the fusion images where the density of the base image has been increased according to the moved amount.

As a result, the operator can obtain the fusion images where desired images have been enhanced, and thus a diagnosis of a complex portion, etc. can be simplified.

Next, the position area 11 in the operation panel display area 2 is provided with a surface fit key 71 for specifying that, as shown in FIG. 17, the respective images in the base area 3 and match area 4 are aligned by setting the region of interest (ROI), a point fit key 72 for specifying that the respective images in the areas 3 and 4 are aligned by setting the fit points, and a set key 73 for specifying display of the dialogue box (FIG. 24) showing the rotation amount and panning amount calculated on a basis of the original display direction and display position of the images currently displayed in the match area 4.

The keys 71 through 73 select "alignment in ROI" or "alignment at fit points" when the match images and base images are aligned, and the details of them will be mentioned later.

Next, the save area 12 in the operation panel display area 2 is provided with a save key for specifying recording of images, when the save key is clicked by the operator, the CPU 27 controls storage of "the match images" displayed currently in the match area 4 into the three-dimensional image data base 26 shown in FIG. 3.

As a result, the desired match images can be saved.

Figure 19:
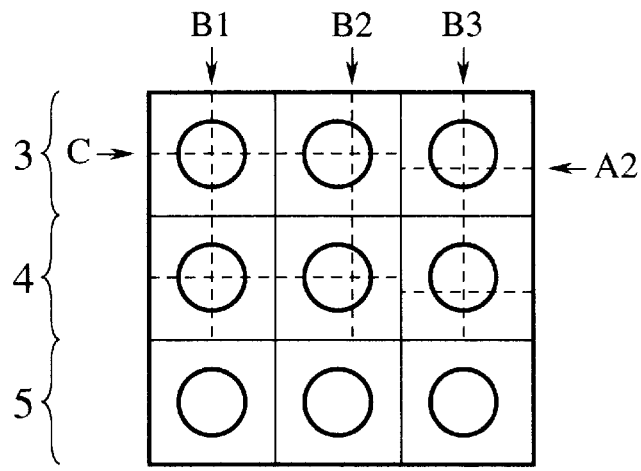
FIG. 19 is a drawing explaining a change of a position of a cross-sectional cursor in the grid area.

Next, when the cross-sectional display mode (MPR display mode) is selected by the display mode switching key 41 mentioned on reference to FIG. 7, the CPU 27 controls display of a coaxial tomogram and cross-sectional cursors A1, A2, B1, B2 and C shown in FIG. 19 for specifying positions on the coaxial tomogram in the image display area 1, and controls display of a cross-sectional cursor display/non-display selecting key 74, a cursor moving condition switching key 75, a cursor position display input section 76, cursor position changing keys 77 through 79 shown in FIG. 18 in the grid area 13 in the operation panel display area 2.

The cross-sectional cursor display/non-display selecting key 74 is composed of a cross-sectional cursor display key 74a and a cross-sectional cursor non-display key 74b. When the cross-sectional cursor display key 74a is clicked, the CPU 27 controls display of the respective cross-sectional cursor A1, A2, B1, B2 and C. Moreover, when the cross-sectional cursor non-display key 74b is clicked, the CPU 27 does not display the cross-sectional cursors A1, A2, B1, B2 and C.

The cursor moving condition switching key 75 switches between independent movements of the respective cross-sectional cursors A1, A2, B1, B2 and C and simultaneous (synchronous) movement of them. The CPU 27 switches these modes by the specifying by the mouse by the operator.

The cursor position display input section 76 displays current positions of the respective cross-sectional cursors A1, A2, B1, B2 and C, and is a section into which desired cursor positions are directly inputted by the operator. The CPU 27 displays cursor positions changed by cursor position changing keys 77 through 79, mentioned later, and controls changes in cursor positions based on the cursor positions inputted by the operator.

The cursor position changing key 77, the cursor position changing key 78 and the cursor position changing key 79 are respectively provided correspondingly to the cross-sectional cursors A1 and A2, the cross-sectional cursors B1 and B2, and the cross-sectional cursor C.

When a right changing key 77a of the cursor position changing key 77 is clicked by the operator, the CPU 27 controls the movement of the cross-sectional cursor A1 shown in FIG. 19 in the right direction according to the operating time, and controls the movement of the cross-sectional cursor A2 in the down direction. When a left changing key 77b is clicked, the CPU 27 controls movement of the cross-sectional cursor A1 in the left direction and moves the cross-sectional cursor A2 in the up direction according to the operating time. When a quick right changing key 77c is clicked, the CPU 27 controls the quick movement of the cross-sectional cursor A1 in the right direction and controls the quick movement of the cross-sectional cursor A2 in the down direction according to the operating time. When a quick left changing key 77d is clicked, the CPU 27 controls the quick movement of the cross-sectional cursor A1 in the left direction and controls the quick movement the cross-sectional cursor A2 in the up direction according to the operating time.

In addition, when a right changing key 78a of the cursor position changing key 78 is clicked by the operator, the CPU 27 controls the movement of the cross-sectional cursors B1 and B2 in the right direction shown in FIG. 19 according to the operating time. When a left changing key 78b is clicked, the CPU 27 controls the movement of the cross-sectional cursors B1 and B2 in the left direction according to the operating time. When a quick right changing key 78c is clicked, the CPU 27 controls the quick movement of the cross-sectional cursors B1 and B2 in the right direction according to the operating time. When a quick left changing key 78d is clicked, the CPU 27 controls the quick movement of the cross-sectional cursors B1 and B2 in the left direction according to the operating time.

In addition, when a down changing key 79a of the cursor position changing key 79 is clicked by the operator, the CPU 27 controls the movement of the cross-sectional cursor C shown in FIG. 19 in the down direction according to the operating time. When a up changing key 79b is clicked, the CPU 27 controls the movement of the cross-sectional cursor C in the up direction according to the operating time. When a quick down changing key 79c is clicked, the CPU 27 controls the quick movement of the cross-sectional cursor C in the down direction according to the operating time. When a quick up changing key 79d is clicked, the CPU 27 controls the quick movement of the cross-sectional cursor C in the up direction according to the operating time.

By making it possible to display and to move the cross-sectional cursors A1, A2, B1, B2 and C, the operator can diagnose on a basis of a desired position on a coaxial tomogram, and thus the convenience of diagnosis can be improved.

The following describes an operation when in the medical image processing apparatus of the present invention, by setting fit points on the match images and base images and aligning the images, fusion images are formed.

First, for example, in the case where an image imaged by the MRI apparatus is aligned with an image imaged by the X-ray CT apparatus so that the fusion image is displayed, the operator specifies it and capture the respective images.

More specifically, in the case where the respective images to be compared or one of the images are stored in the three-dimensional image data base 26, the CPU 27 controls reading-out from the three-dimensional image data base 26 according to the specifying by the operator, and captures the respective images or one of the images. In another way, in the case where the respective images to be compared or one of the images are supplied from the apparatuses as external inputs, the CPU 27 captures the images via the image input interface 25.

When the CPU 27 captures, the respective images, three-dimensional X-ray images are formed on the image storage section 23 shown in FIG. 3 based on a plurality of two-dimensional X-ray coaxial tomograms as mentioned above, and they are "base images" as "images with which images are aligned". Moreover, the CPU 27 forms the three-dimensional X-ray images on the image storage section 23 shown in FIG. 3 based on a plurality of two-dimensional MRI coaxial tomograms, and they are "match images" as "images which are aligned with the base image"

Next, when the three-dimensional X-ray images of the respective apparatuses are formed on the image storage section 23, the CPU 27 controls display of the formed three-dimensional images on the image display area 1 of the image display section 21, and controls display of the operation panel provided with the above-mentioned keys on the operation panel display area 2.

The display formats of the images are selected by the 1-section display key 31 and 9-section display key 32 described on reference with FIG. 4. When the one-section display key 31 is clicked, the CPU 27 displays one section of the image selected by the study selecting key 33 on the whole image display area 1, and when the 9-section display key 32 is clicked, the CPU 27 divides the image display area 1 into nine parts as mentioned on reference with FIG. 6 so as to control display of the base image on the upper part, the match image on the middle part and the fusion image on the lower part.

The display modes of the respective images displayed as one or nine sections of the images is selected by the display mode switching key 41 shown in FIG. 7, and in the initial setting, the cross-section display mode (MPR display mode) is set. For this reason, when the operator does not specify the switching of the display modes, the CPU 27 controls the image processing section 22 so that the coaxial tomograms are formed from the three-dimensional images formed in the image storage section 23, and displays 9 sections or 1 section of the coaxial tomograms formed in such a manner shown in FIG. 21.

In addition, when the operator clicks the display mode switching key 41, the CPU 27 switches the display mode from the MPR display mode which is the initial setting state to the surface display mode, and controls the image processing section 22 so that the surface image is formed from the three-dimensional images formed on the image storage section 23. Moreover, the CPU 27 displays 9 sections or one section of the surface image formed as shown in FIG. 1.

Next, when the 9 sections of the coaxial image or surface image are displayed in the image display area 1, the operator changes a window value, adjusts the display direction, display position and zoom rate using the bright mode specifying key 44, display direction changing mode specifying key 46, the display position changing mode specifying key 47 and the zoom rate changing mode specifying key 48 described on reference with FIG. 10 and FIGS. 12 through 14 so as to adjust the display direction, display position, zoom rate, etc. of the base images and match images.

Next, when the adjustment for the base images and match images is completed, the operator selects a method of aligning the images. In the medical image processing apparatus of the present invention, the images are aligned by setting the fit points or ROI.

First, in the case where the images are aligned by setting the fit points, the operator clicks the point fit key 72 shown in FIG. 17 in the position area 11. When the point fit key 72 is clicked, the CPU 27 controls display of the fit mode display key 45 in the mouse mode area 8 as shown in FIG. 11 so that it shows the operator that the setting mode is for alignment.

Figure 20:
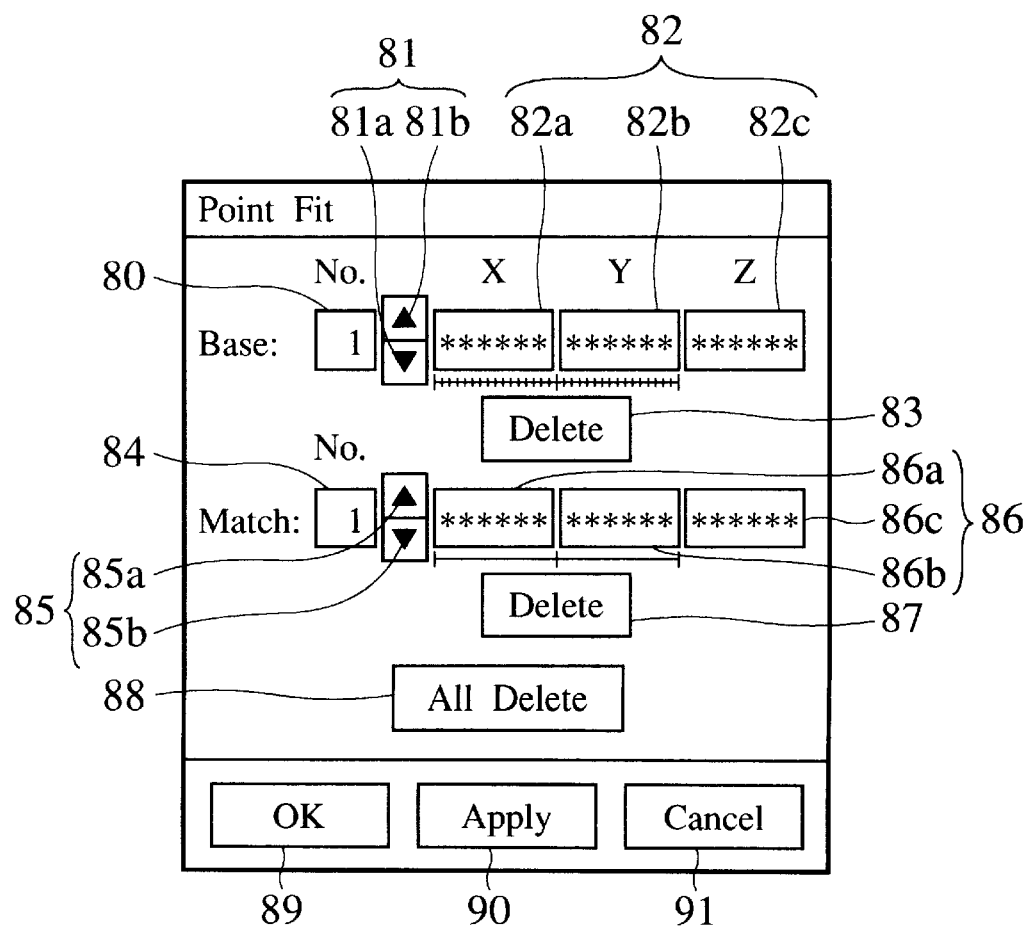
FIG. 20 is a drawing showing a setting screen of the fit points displayed on the operation panel when the fit mode specifying key is clicked.

In addition, at the same time, the CPU 27 displays the dialogue box shown in FIG. 20 in the operation panel display area 2. The dialogue box is provided with a fit point number display section 80 on which the numbers of the fit point set to the base images are displayed, fit point coordinate display sections 82 on which coordinates X, Y and Z of the fit points set to the base images are displayed, fit point changing keys 81 for changing the fit points displayed on the fit point coordinate display sections 82, and a delete key 83 for canceling the fit points set to the base images displayed on the fit point number display section 80.

In addition, the dialogue box is provided with a fit point number display section 84 on which the numbers of the fit points set to the match images are displayed, fit point coordinate display sections 86 on which coordinates X, Y and Z of the fit points set to the match images are displayed, fit point changing keys 85 for changing the fit points displayed on the fit point coordinate display section 86, and a delete key 87 for canceling the fit points set to the match images displayed on the fit point number display section 84.

In addition, the dialogue box is provided with a all delete key 88 for canceling all the fit points set to the base images and match images, a setting end key 89 which is clicked when setting of the fit points is ended, an execution specifying key 90 for specifying start of the alignment at the fit points, and a cancel key 91 which is clicked when the alignment at the fit points is stopped and another process is executed.

For example, as shown in FIG. 1, when surfaces of a front image, right side image, and image of a top of the head as the base images (images of the X-ray CT apparatus) are displayed in the regions 3a through 3c in the base area 3, and surfaces a front image, right side image and an image of a top of the head portion as the match images (images of the MRI apparatus) are displayed in the regions 4a through 4c of the match area 4, the operator, first, sets one fit point or a plurality of fit points to positions of the base images having anatomic characteristics such as an eyeball and an ear hole.

When the fit points are set, as shown by the fit points F1A through F3A in FIG. 1, the CPU 27 marks the positions of the base images, to which the fit points have been set, with white points, etc. Moreover, the positions are numbered in the order that the fit points have been set, and each of the numbers is displayed on the fit point number display section 80 for the base images shown in FIG. 20, and the coordinates X, Y and Z of the fit points corresponding to the displayed number are displayed on the respective coordinate display sections 82a, 82b and 82c.

Here, even if the fit points are set only on the front image, for example, the CPU 27 marks the corresponding positions of the right side image and image of a top of the head portion.

In the case where the operator wants to confirm the coordinates X, Y and Z of fit points other than the one currently displayed, the operator clicks the display changing keys 81 shown in FIG. 20. Every time an up changing key 81*a* of the display changing keys 81 is clicked, the CPU 27 increments the number and displays it on the fit point number display section 80, and controls display of the coordinates X, Y and Z of the fit points corresponding to the displayed number on the respective coordinate display sections 82*a*, 82*b* and 82*c*.

In addition, every time a down changing key 81*b* of the display changing keys 81 is clicked, the CPU 27 increments the number and displays it on the fit point number display section 80, and controls display of the coordinates X, Y and Z of the fit points corresponding to the displayed number on the respective coordinate display sections 82*a*, 82*b* and 82*c*.

As a result, the operator can confirm the coordinates X, Y and Z of the set fit points.

In addition, in the case where the operator wants to delete the fit points of the base images set in such a manner, the operator clicks the display changing keys 81 so that the number of the fit point to be deleted is displayed on the fit point number display section 80, and clicks the delete key 83. When the delete key 83 is clicked, the CPU 27 deletes the number and coordinates X, Y and Z displayed on the fit point number display section 80.

When the setting of the fit points of the base images is completed, the operator sets one fit point or a plurality of fit points on the position(s) of the match images which are the same as the position(s) of the base images. In this example, as shown in FIG. 1, three fit points F1B through F3B are set on the match images.

When the fit points are set, the CPU 27 numbers the positions in the order that the fit points have been set, controls display of the numbers on the fit point number display section 84 for the match images shown in FIG. 20, and controls display of the coordinates X, Y and Z of the fit points corresponding to the displayed number on respective coordinate display sections 86*a*, 86*b* and 86*c*.

In the case where the operator wants to confirm the coordinates X, Y and Z of fit points other than the fit point currently displayed, the operator clicks the display changing keys 85 shown in FIG. 20.

Every time an up changing key 58*a* of the display changing keys 85 is clicked, the CPU 27 increments the number and displays it on the fit point number display section 84, and controls display of the coordinates X, Y and Z of the fit points corresponding to the displayed number on the respective coordinate display sections 86*a*, 86*b* and 86*c*.

In addition, every time a down changing key 85*b* of the display changing keys 85 is clicked, the CPU 27 increments the number and displays it on the fit point number display section 84, and controls display of the coordinates X, Y and Z of the fit points corresponding to the displayed number on the respective coordinate display sections 86*a*, 86*b* and 86*c*.

As a result, the operator can confirm the coordinates X, Y and Z of the set fit points. Moreover, As mentioned above, by clicking the display changing keys 81 for the base images, the coordinates X, Y and Z of the fit points set on the base images are displayed on the fit point coordinate display section 82. For this reason, by setting the fit points of the match images while watching the coordinates, the operator can set the fit points on the same positions of the base images and match images.

Next, in the case where the operator wants to delete a fit point of the match images set in such a manner, the operator clicks the display changing keys 85 so that the number of the fit point to be deleted is displayed on the fit point number display section 84, and clicks the delete key 87. When the delete key 87 is clicked, the CPU 27 deletes the number and coordinates X, Y and Z displayed on the fit point number display section 84.

Here, in the case where after the fit point of the base images or the fit points of the match images is deleted, new fit point is set, the CPU 27 gives the number of the deleted fit point to the new fit point.

Next, when the setting of the fit points are ended, the operator clicks the setting end key 89 or execution specifying key 90.

When the setting end key 89 or execution specifying key 90 is clicked, the CPU 27 calculates a coordinate transformation matrix such that the positions of the fit points set on the base images coincide with positions of corresponding fit points set on the match images, and aligns the match images with the base images based on the coordinate transformation matrix and displays them, and composes both the aligned images so as to form fusion images.

More specifically, the CPU 27 calculates the coordinate transformation matrix according to so-called "method of least square", namely, calculates a coordinate transformation matrix T according to the following equation (1) such that the sum of the square of a distance ($/P_{Bi}P\%_{Mi}$) between a coordinate $P\%_{Mi}$ which is obtained by transforming the fit point $P_{Mi}$ (i=1 to n) of the match image by a prescribed transformation matrix T and the fit point $P_{Bi}$ (i=1 to n) of the corresponding base image.

$$\text{Cost}(T) = \sum_{i=1}^{n} \overline{P_{Bi}P\%_{Mi}}^2 \Rightarrow 0 \qquad P\%_{Mi} = P_{Mi} \cdot T \qquad (1)$$

This coordinate transformation matrix T is composed of a rotation component and a parallel component on the XYZ axes and can be represented by the following equation (2).

$$T = Scale \cdot Rx(\alpha) \cdot Ry(\beta) \cdot Rz(\gamma) \cdot Tx(tx) \cdot Ty(ty) \cdot Tz(tz) \qquad (2)$$

Scale: zoom rate between base data and match data
Rx($\alpha$): rotation matrix of an angle $\alpha$ about the X-axis
Ry($\beta$): rotation matrix of an angle $\beta$ about the Y-axis
Rz($\gamma$): rotation matrix of an angle $\gamma$ about the Z-axis
Tx(tx): parallel panning matrix of a panning amount tx in the direction of the X-axis
Ty(ty): parallel panning matrix of a panning amount ty in the direction of the Y-axis
Tz(tz): parallel panning matrix of a panning amount tz in the direction of the Z-axis The CPU 27 displays the match image and base image with the match image being aligned with the base image based on the coordinate transformation matrix T calculated in such a manner. Then, the CPU 27 composes both the aligned images so as to form a fusion image, and controls display of the fusion image on the fusion area 5 in the image display area 1.

As a result, as shown in FIG. 1, for example, a fusion image, which has been obtained by composing the surface image imaged by the X-ray CT apparatus as the base image with the surface image imaged by the MRI apparatus as the match image, can be displayed on the fusion area 5.

For this reason, the images can be compared with each other realistically and visually, thereby greatly contributing to the accurate diagnosis and simplifying of a medical treatment plan by a doctor, etc.

The above explanation refers to the case where the surface images are selected as the base image and match image and they are aligned and composed at fit points, but the medical image processing apparatus of the present invention can also select coaxial tomograms as the base image and match image and align and compose them with each other at fit points so as to display the obtained image.

In this case, the operator clicks the display mode switching key 41 so as to select the MPR display mode. When the MPR display mode is selected, the CPU 27 controls the image processing section 22 so that a coaxial tomogram is formed from three-dimensional images formed in the image storage section 23, and controls displays of 9 sections or one section of the coaxial tomogram formed as shown in FIG. 21.

Next, in the case where 9 sections of the coaxial tomogram is displayed in the image display area 1, the operator adjusts a change in the window value, display direction, display position and zoom rate using the bright mode specifying key 44, display direction changing mode specifying key 46, display position changing mode specifying key 47 and zoom rate changing mode specifying key 48 explained on reference with FIG. 10 and FIGS. 12 through 14 so as to adjust the display direction, display position, zoom rate, etc. of the base image and match image.

Figure 21:
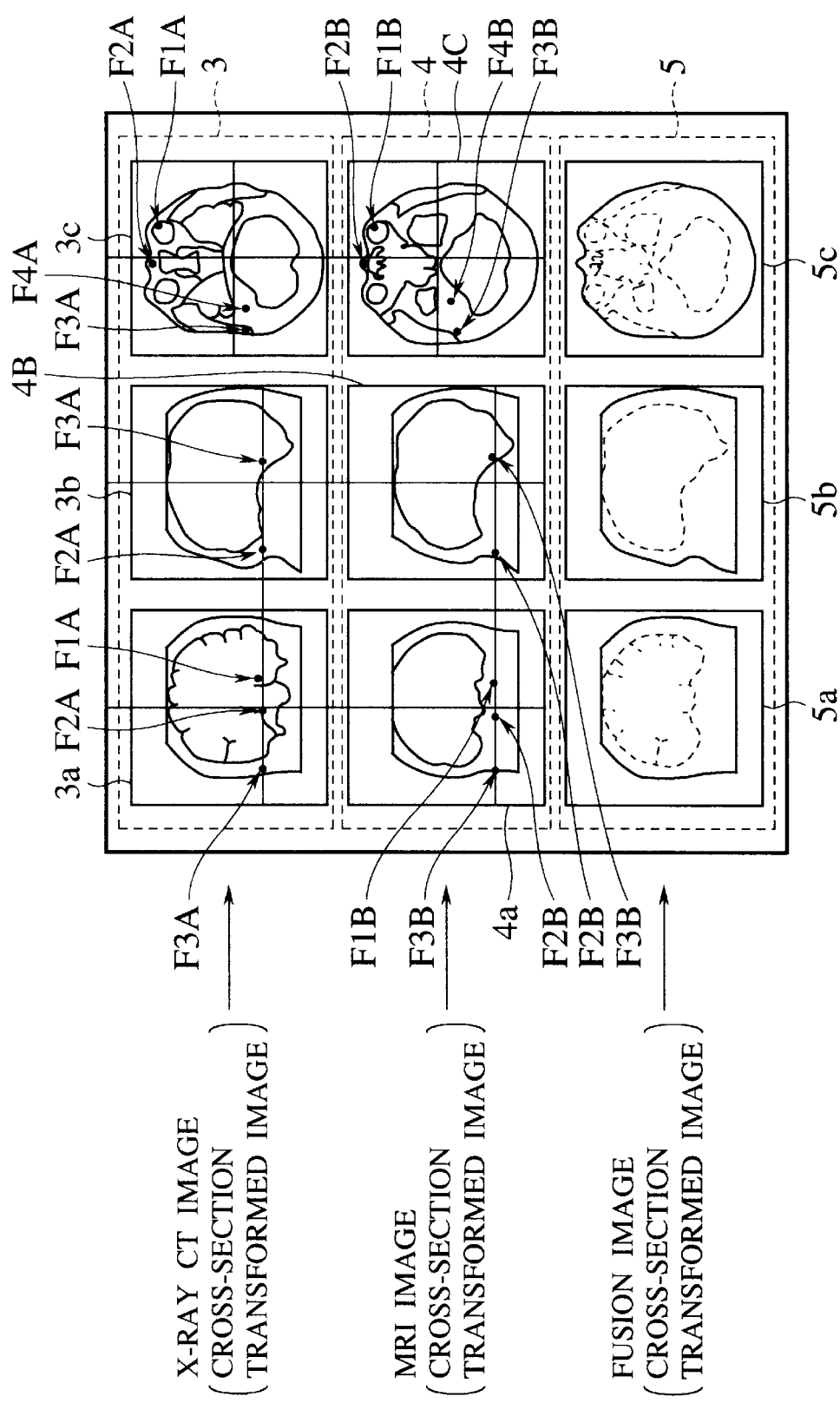
FIG. 21 is a schematic drawing showing a result of composing coaxial tomograms obtained by different modalities with each other and displaying a fusion coaxial tomogram on the image display section.

Next, the operator clicks the point fit key 72 shown in FIG. 17 so as to select the fit mode, and sets fit points FA1 through FA4 and FB1 through FB4 on the base images and match images as shown in FIG. 21, for example. As a result, numbers of the fit points and coordinates X, Y and Z are displayed on the dialogue box shown in FIG. 20.

Next, when the setting of the fit points are ended, the operator clicks the setting end key 89 or execution specifying key 90 of the dialogue box shown in FIG. 20.

When the setting end key 89 or execution specifying key 90 is clicked, the CPU 27 calculates a coordinate transformation matrix such that positions of the fit points set on the base images coincide with positions of corresponding fit points set on the match images based on the aforementioned equations (1) and (2), and displays the match images and base images with the match images being aligned with the base images using the coordinate transformation matrix. Then, by composing the aligned images, as shown in FIG. 21, fusion images, which have been obtained by composing coaxial tomograms of the X-ray CT apparatus with coaxial tomograms of the MRI apparatus, are formed and displayed on the fusion area 5.

As a result, in the similar manner to the above one, the images can be compared with each other realistically and visually, thereby contributing to the accurate diagnosis and simplifying of a medical treatment plan by a doctor etc.

In the medical image processing apparatus of the present invention, in the case where the images of different modalities are aligned with each other and displayed, "reliability" of the alignment can be displayed.

Figure 22:
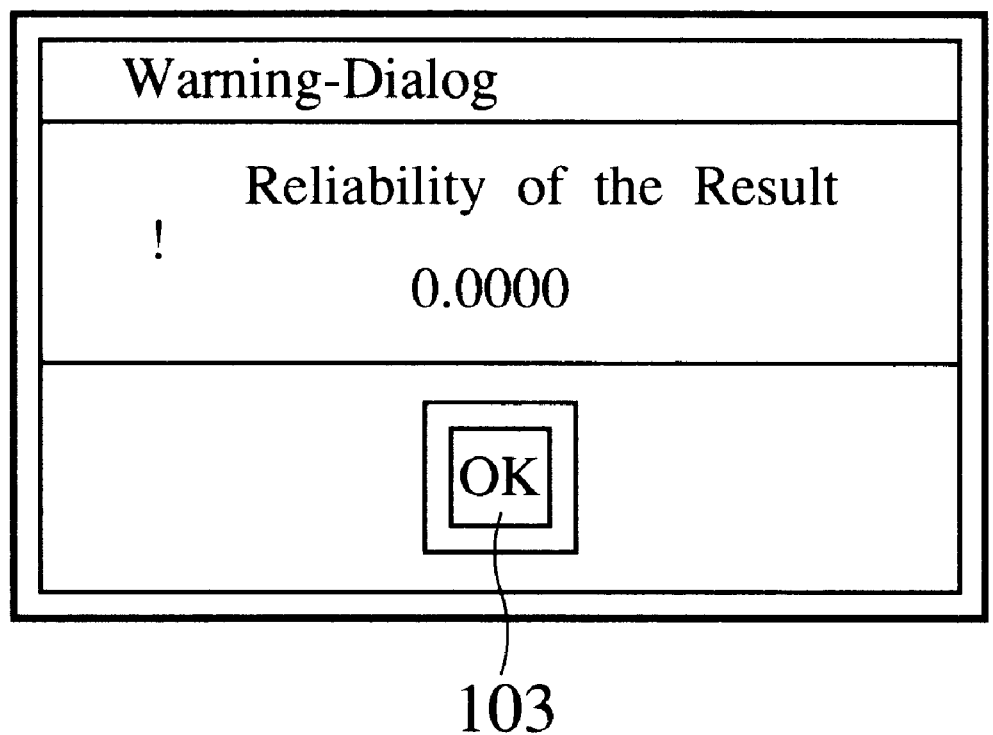
FIG. 22 is a drawing showing a dialogue box which displays "reliability" of the fusion image obtained by making alignment at the fit points (or ROI)

Namely, when the operator clicks the setting end key 89 or execution specifying key 90 in the dialogue box shown in FIG. 20, the CPU 27 controls display of the fusion images of the base images and match images as mentioned above, and controls display of the dialogue box shown in FIG. 22 in the operation panel display area 2. Then, the CPU 27 controls display of the "reliability" such as "0.0001" in the dialogue box.

Figure 23:
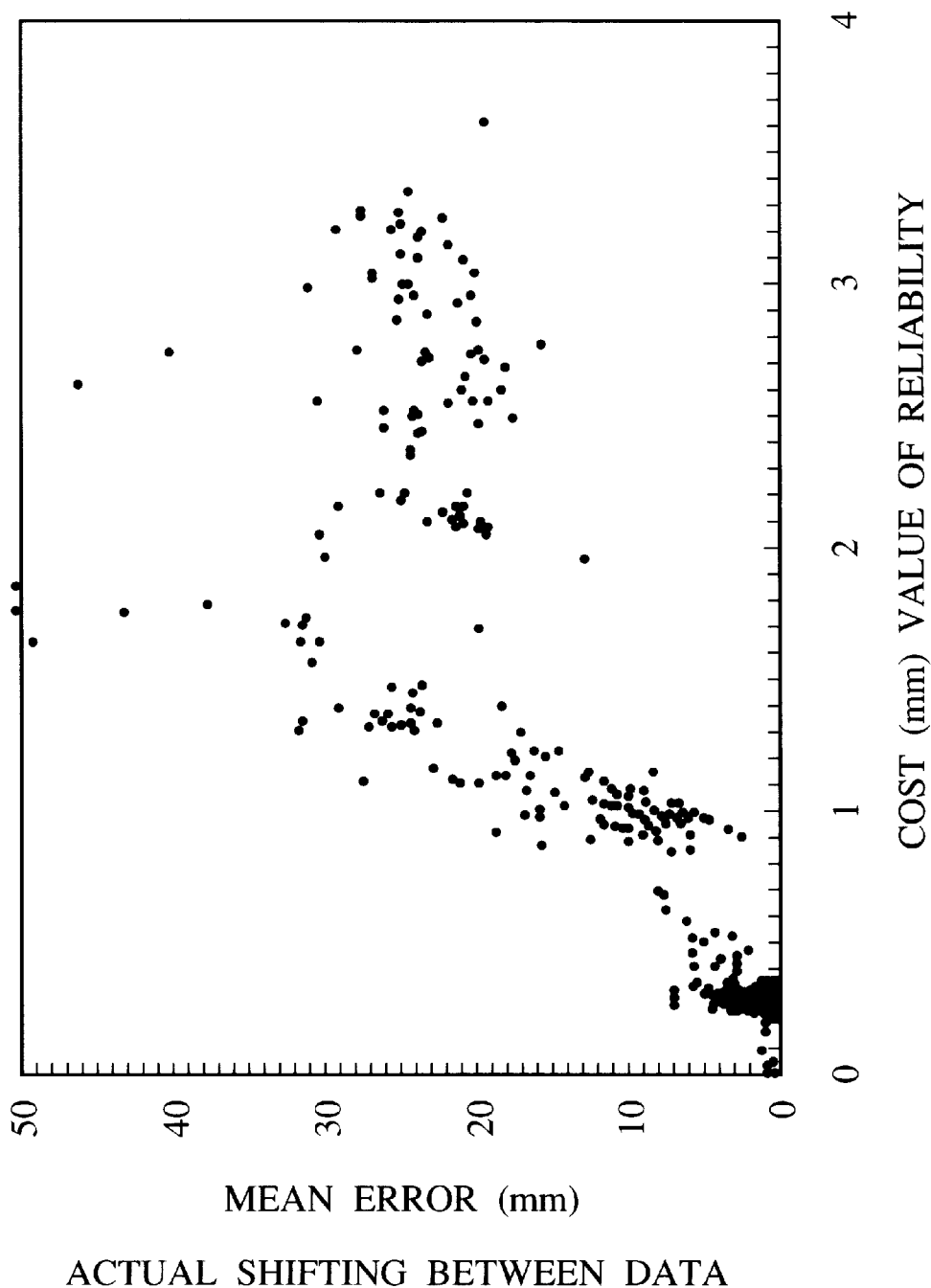
FIG. 23 is a graph showing a relationship between an actual shifting amount and "reliability" of the images.

The relationship between an actual shifting amount of the images and the reliability which is experimentally obtained is shown in the graph of FIG. 23. As is clear from the graph, the actual shifting amount of the images and the reliability are interrelative. Therefore, as the reliability increases, the actual shifting amount of the images becomes larger, and as the reliability decreases, the actual shifting amount of the images becomes smaller. Namely, the actual shifting amount can be estimated by the reliability.

For this reason, the operator can measure the trustworthiness of the fusion image by confirming the "reliability" displayed in the dialogue box after the images are aligned, and it can be useful for the diagnosis, medical treatment plan, etc.

Here, after the operator confirms the "reliability", the operator clicks an end key 103 provided to the dialogue box. As a result, the CPU 27 controls non-display of the dialogue box, and waits for a process to be specified thereafter.

Next, the medical image processing apparatus of the present invention, a rotation amount and panning amount calculated on a basis of the original display direction and display position of the match image can be confirmed, and in the case of this confirmation, the operator clicks the set key 73 shown in FIG. 17.

Figure 24:
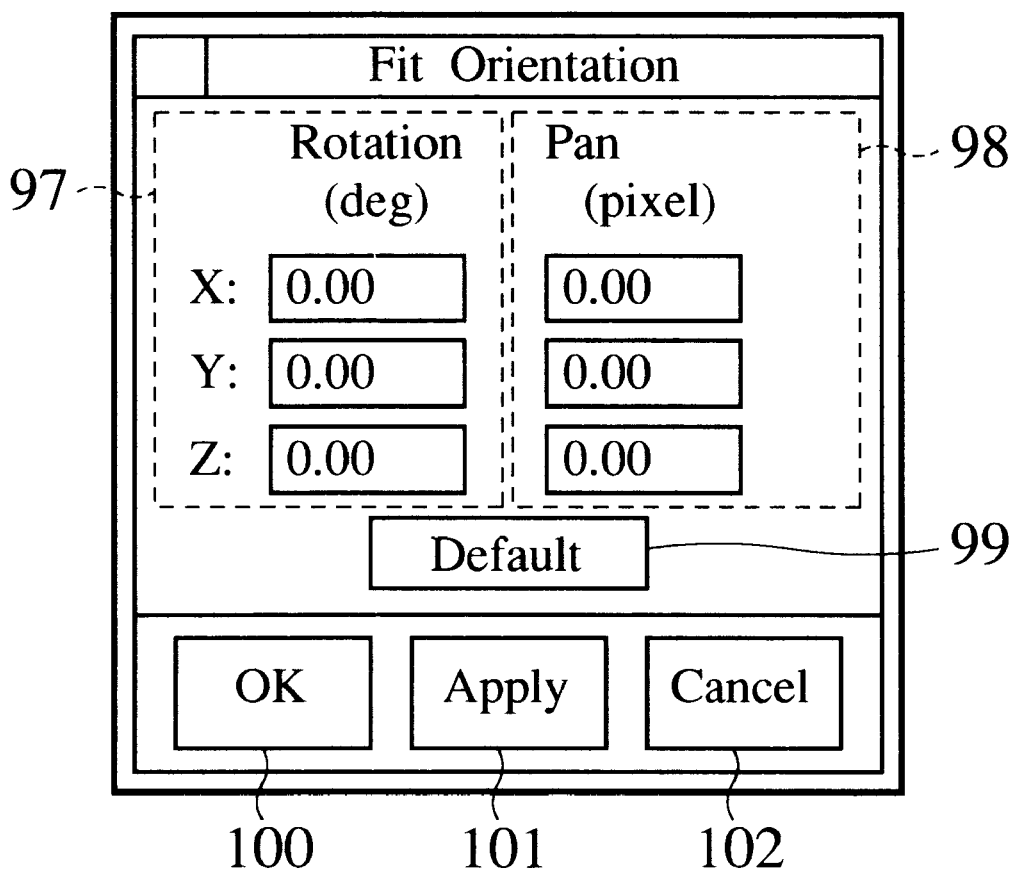
FIG. 24 is a drawing showing a dialogue box which displays a rotation amount, a panning amount, etc. of the displayed images.

When the set key 73 is clicked, the CPU 27 displays a dialogue box shown in FIG. 24 on the operation panel display area 2.

This dialogue box is provided with a rotation amount display/input section 97 for displaying a shift of an angle on a basis of the original position of the match image and inputting a desired angle by the operator thereon, a panning amount display/input section 98 for displaying a parallel panning amount on a basis of the original position of the match image and inputting a desired parallel panning amount by the operator thereon, and a default key 99 which is clicked when the match image is returned from a current position to the original position.

In addition, the dialogue box is provided with a setting end key 100 which is clicked when the match image is rotated and panned parallel according to the values inputted into the rotation amount display/input section 97 and panning amount display/input section 98 by the operator and the setting is ended, an execution key 101 which is clicked when the setting is not ended and the match image is rotated and panned parallel according to the values inputted into the rotation amount display/input section 97 and panning amount display/input section 98 by the operator, and a cancel key 102 which is clicked when the values inputted into the rotation amount display/input section 97 and panning amount display/input section 98 are canceled.

When the set key 73 is clicked, the CPU 27 controls display of the shift of the angle and parallel panning amount per coordinates X, Y and Z on the rotation amount display/input section 97 and panning amount display/input section 98 in the dialogue box.

In the case where the displayed shift of the angle and parallel panning amount obtain desired values, the operator inputs the desired values into the rotation amount display/input section 97 and panning amount display/input section 98, and clicks the setting end key 100 or execution key 101. When the key 100 or key 101 is clicked, the CPU 27 rotates and parallel pans the match image according to the inputted values and controls display of the match image. As a result, the display position of the match image can be a desired display position.

In the medical image processing apparatus of the present invention, the base image and match image can be aligned with each other by setting a region of interest (ROI) on the base image.

Figure 25:
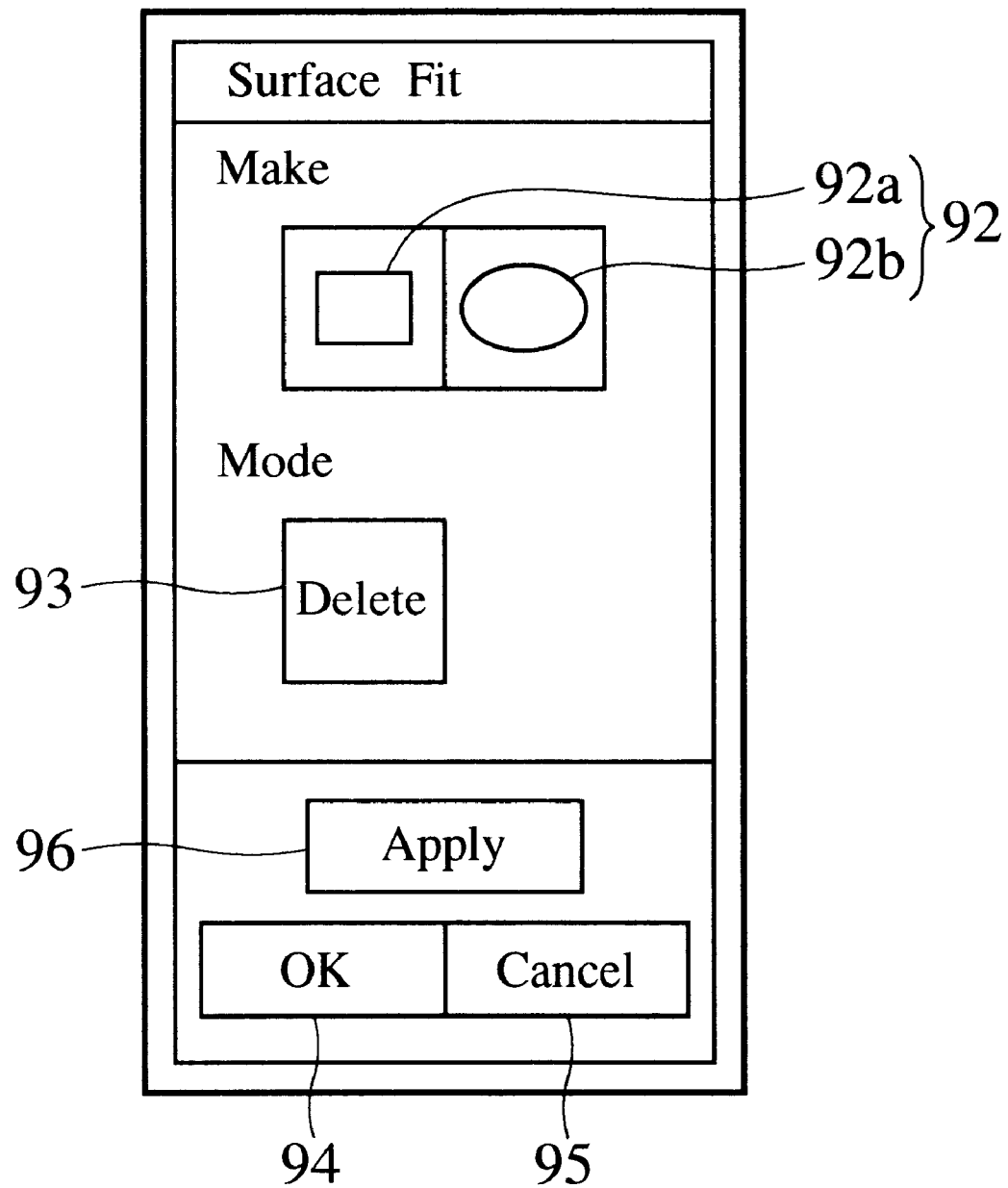
FIG. 25 is a drawing showing a dialogue box displayed in the mouse mode area when the images obtained by different modalities are composed by setting region of interest (ROI)

In the case where the images are aligned with each other in the ROI, the operator, as mentioned above, displays 9 sections of the surface image of different modalities, and clicks the surface fit key 71 shown in FIG. 17. When the surface fit key 71 is clicked, the CPU 27 controls display of a dialogue box shown in FIG. 25 on the operation panel display area 2.

This dialogue box is provided with ROI form selecting keys 92 for selecting a form of the ROI to be set, a delete key 93 for deleting the set ROI, a setting end key 94 which is clicked when the setting of ROI is ended, a cancel key 95 which is clicked when the alignment in the ROI is canceled, and an execution key 96 which is clicked when execution of the alignment in the set ROI is specified.

Here, the setting end key 94 and execution key 96 specify starting of the execution of the alignment of the images, but when the setting end key 94 is clicked, the CPU 27 ends the setting mode of the ROI after the alignment of the images, and when the execution key 96 is clicked, the CPU 27 does not end the setting mode of the ROI even after the alignment of the images is ended.

ROI is set on the base image, for example, and in the case where rectangular ROI is set, the operator clicks a rectangular ROI selecting key 92a of the ROI form selecting keys 92. Moreover, in the case where circular ROI is set, the operator clicks a circular ROI selecting key 92b of the ROI form selecting keys 92.

Next, the operator drags from a starting point to an end point of a portion of the base image to which ROI is set using the mouse.

Figure 26A:
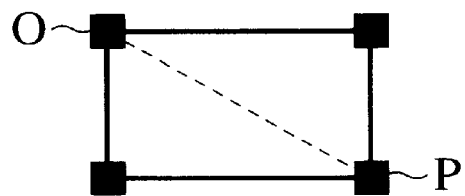
FIGS. 26A and 26B are drawings explaining a rectangular ROI and a circular ROI set by operating the dialogue box.

More specifically, in the case where the setting of rectangular ROI is selected, the operator drags from the starting point O to the end point P of a portion to which ROI is set as shown by dotted line in FIG. 26A using the mouse. When the dragging from the starting point O to the end point P is executed by the mouse, the CPU 27, as shown by a solid line in FIG. 26A, controls display of the rectangular ROI whose diagonal is the dragged line with, for example, red, and controls display of "knobs" on the four corners of the ROI.

Figure 26B:
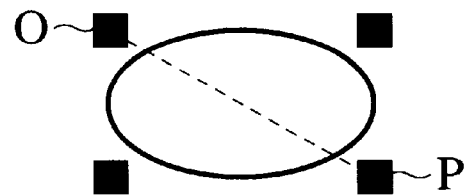

In addition, in the case where the setting of circular ROI is selected, the operator, as shown by a dotted line in FIG. 26B, drags from the starting point O to the end point P of a portion to which ROI is set using the mouse. When the dragging from the starting point O to the end point P is executed by the mouse, the CPU 27 controls display of, as shown by a solid line in FIG. 26B, elliptic ROI with red, and controls display of "knobs" on the four corners which surround the elliptic ROI.

Figure 27:
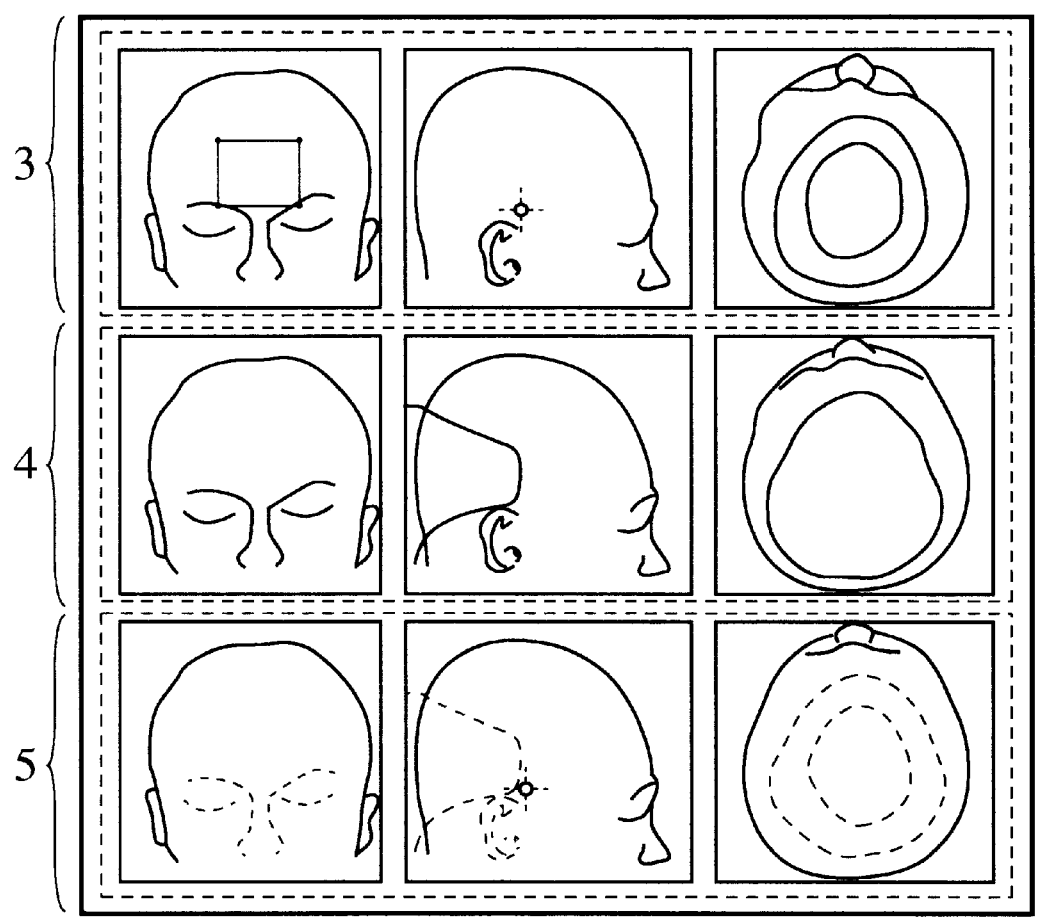
FIG. 27 is a drawing showing fusion images obtained by aligning according to the rectangular ROI.

As a result, as shown in FIG. 27, for example, the rectangular ROI is inconclusively set on the surface image of the base image.

When the "knobs" are displayed, the set ROI can be deformed, so when the operator moves the knobs using the mouse, the CPU 27 controls display of the ROI deformed according to the moving amount.

The ROI which has been inconclusively set in such a manner is defined by clicking the defining key of the mouse, and when the defining key is clicked, the CPU 27 controls display of the ROI, which has been displayed with red, with yellowish green, for example, and defines and sets the rectangular ROI shown in FIG. 27. When the display color of the ROI is changed into yellowish green, the operator can recognize the definition of the set ROI.

In the case where deformation, etc. of the ROI is edited again after the definition, the operator clicks the inside of the ROI. As a result, the CPU 27 controls display of the ROI, which has been displayed with yellowish green, with red again. As a result, the form of the ROI can be edited again by moving the "knobs" as mentioned above.

Here, since the alignment in ROI is executed according to the surface form of the image in the ROI, it is preferable that the size of ROI set by the operator is limited to not less than a suitable size such as not less than 30 pixels.

In the case where the set ROI is deleted, the operator clicks the inside of the ROI. As a result, the CPU 27 controls display of the ROI, which has been displayed with yellowish green, with red again.

Next, the operator confirms that the ROI is displayed with red and clicks the delete key 93. When the delete key 93 is clicked after clicking the inside of the ROI, the CPU 27 deletes the ROI from the base image. As a result, unnecessary ROI is deleted and resetting, etc. is possible.

In such a manner, when ROI is set in a desired region of the base image and the setting end key 94 or execution key 96 is clicked, the CPU 27 calculates a coordinate transformation matrix based on the following equation such that a surface form in the ROI set on the base image can coincide with a surface form of the corresponding match image.

As an average value or a square average value of a distance between a coordinate of the pixels on the surface in the ROI set on the base image and a surface coordinate of the nearest match image is smaller, the surface form in the ROI of the base image and the surface form of the corresponding match image coincide with each other more accurately.

Therefore, the CPU 27 a coordinate transformation matrix T by the aforementioned "method of least square" according to the following equation (3) or (4) such that the average value or square average value of a distance ($/P_{Bi}P\%_{Mi}$) between one point $P_{Bi}$ (i=1 to n) in the ROI set on the base image and a coordinate $P\%Mi$, which is obtained by transforming a point $P_{Mi}$ (i=1 to n) of the match image which is the nearest to the point $P_{Bi}$ according to prescribed coordinate transformation T, becomes minimum.

$$\text{Cost}(T) = \frac{1}{n}\sum_{i=1}^{n}\overline{P_{Bi}P\%_{Mi}} \Rightarrow \quad P\%_{Mi} = P_{Mi} \cdot T \tag{3}$$

$$\text{Cost}(T) = \frac{1}{n}\sum_{i=1}^{n}\overline{P_{Bi}P\%_{Mi}}^2 \Rightarrow \quad P\%_{Mi} = P_{Mi} \cdot T \tag{4}$$

The coordinate transformation matrix T is also, as mentioned above, composed of a rotation component on the respective XYZ axes and parallel component, and it can be represented by the following equation (5).

$$T = \text{Scale } Rx(\alpha) \cdot Ry(\beta) \cdot Rz(\gamma) \cdot Tx(tx) \cdot Ty(ty) \cdot Tz(tz) \tag{5}$$

The CPU 27 displays the base image and match image with the match image being aligned with the base image based on the coordinate transformation matrix T calculated in such a manner. Then, the CPU 27 composes both the aligned images so as to form the fusion image, and controls display of the fusion image on the fusion area 5 in the image display area 1, and controls display of "reliability" on the dialogue box shown in FIG. 22.

As a result, as shown in FIG. 27, for example, the fusion image, which is obtained by composing a surface image imaged by the X-ray CT apparatus as the base image with a surface image imaged by the MRI apparatus as the match image, can be displayed on the fusion area 5.

For this reason, the images can be compared with each other realistically and visually, thereby contributing to the accurate diagnosis and simplifying of a medical treatment plan by a doctor, etc.

Finally, in the above description of the embodiments, data for a plurality of coaxial tomograms are captured, but data only for one coaxial tomogram may be captured. In this case, it is difficult to display three-dimensional pseudo images, but the alignment at the aforementioned fit points and in the ROI can be executed without any problem, and it makes it possible to compare two-dimensional fusion images.

In addition, the coordinate transformation matrix is calculated by the method of least square, but the optimizing methods, described later, such as "steepest descent method", "simulated annealing method" and "down hill simplex method" may be used.

More specifically, in "the steepest descent method", an initial variable is given, a grade of its point is obtained, the minimum value is calculated while the variable is being moved in a direction where the grade becomes negative (a falling direction of a function), and the variable to be the minimum value is considered as the optimized variable. Moreover, in the "simulated annealing method", the variable is changed so that the value of the function becomes smaller gradually, and a variable in which the value of the function becomes the smallest is considered as the optimized variable. Moreover, in the "down hill simplex method", plural combinations of variables are set, mapping of the variables is moved geometrically towards the bottom of the function, and the optimized variable is finally obtained.

The medical image processing apparatus of the present invention can superimpose and compose the images imaged by modalities using different imaging method on and with each other in the same position and with the same size, and display the fusion image. For this reason, the images can be compared with each other realistically and visually, thereby contributing to the accurate diagnosis and simplifying of a medical treatment plan by a doctor, etc.

Here, the aforementioned embodiments are just examples of the present invention, and it will be obvious that the present invention may be varied in many ways according to its design, etc. as long as such variations are not to be regarded as a departure from the spirit and scope of the invention.

What is claimed is:

1. A medical image processing apparatus comprising
    image capturing means for capturing a plurality of medical images obtained by imaging an object to be examined;
    aligning means for aligning the medical images captured by said image capturing means;
    fusion image forming means for forming a fusion image by superimposing the medical images aligned by said aligning means on each other;
    display means for displaying the medical images thereon; and
    display control means for controlling the display of the respective medical images captured by said image capturing means and the fusion image of the respective medical images formed by said fusion image forming means on said display means.

2. The medical image processing apparatus according to claim 1, further comprising:
    ROI setting means for setting desired regions of the respective medical images displayed on said display means or a desired region of one of the medical images as a region of interest,
        wherein said aligning means aligns the respective medical images with each other so that image information in the region of interest set by said ROI setting means coincides with each other for plural of said respective medical images.

3. The medical image processing apparatus according to claim 1, further comprising:
    fit point setting means for setting fit points to be reference points for the alignment on the respective medical images displayed on said display means,
        wherein said aligning means aligns the respective medical images with each other by superimposing the respective medical images so that the fit points set by said fit point setting means coincide with each other.

4. The medical image processing apparatus according to claim 3, wherein:
    said display control means detects point coordinates of the fit points set by said fit point setting means so as to display the coordinates on said display means, the apparatus further comprising:
        point coordinate changing means for changing the point coordinates of the fit points displayed on said display means by inputting desired point coordinates,
            wherein when the point coordinates of the fit points are changed by said point coordinate changing means, said aligning means aligns the medical images based on the fit points whose point coordinates have been changed.

5. The medical imago processing apparatus according to claim 1, wherein said image capturing means captures a plurality of coaxial tomograms imaged by different imaging methods.

6. The medical image processing apparatus according to claim 5, further comprising:
    three-dimensional image forming means for forming three-dimensional pseudo images of the respective imaging methods based on said plurality of two-dimensional coaxial tomograms captured by said image capturing means,
        wherein said aligning means aligns the three-dimensional images formed by said three-dimensional image forming means, and said fusion image forming means superimposes the three-dimensional images aligned by said aligning means on each other so as to form fusion images.

7. The medical image processing apparatus according to claim 6, further comprising:
    ROI setting means for setting desired regions of the respective medical images displayed on said display means or a desired region of one of the medical images as a region of interest,
        wherein said aligning means aligns the medical images so that image information in the region(s) of interest set by said ROI setting means coincides with each other.

8. The medical image processing apparatus according to claim 6, further comprising:
    fit point setting means for setting fit points to be reference points for the alignment on the respective medical images displayed on said display means,
        wherein said aligning means superimposes the respective medical images so that the fit points set by said fit point setting means coincide with each other so as to align the medical images with each other.

9. The medical image processing apparatus according to claim 8, wherein:
    said display control means detects point coordinates of the fit points set by said fit point setting means so as to display the coordinates on said display means, the apparatus further comprising:

point coordinate changing means for changing the point coordinates of the fit points displayed on said display means by inputting desired point coordinates,
wherein when the point coordinates of the fit points are changed by said point coordinate changing means, said aligning means aligns the respective medical images based on the fit points whose point coordinates have been changed.

10. The medical image processing apparatus according to claim 1, further comprising display changing means for changing a display position and zoom rate when the respective medical images displayed on said display means are two-dimensional images, or changing a display position, display direction and zoom rate when the respective medical images displayed on said display means are three-dimensional images.

11. The medical image processing apparatus according to claim 1, wherein when display of the fusion image and the respective medical images captured by sale image capturing means on said display means is controlled, said display control means controls simultaneous display of a plurality of images viewed from plural directions regarding each of the fusion image and the respective medical images.

12. A medical image processing apparatus comprising:

image capturing means for capturing a plurality of medical images obtained by imaging an object to be examined;

aligning means for aligning the medical images captured by said image capturing means;

fusion image forming means for forming a fusion image by superimposing the medical images aligned by said aligning means on each other;

display means for displaying the medical images thereon; and display control means for controlling the display of the fusion image of the respective medical images formed by said fusion image forming means on said display means,
wherein when display of the fusion image on said display means is controlled, said display control means controls simultaneous display of a plurality of images viewed from plural directions.

\* \* \* \* \*